US011758471B2

(12) United States Patent
Xin et al.

(10) Patent No.: US 11,758,471 B2
(45) Date of Patent: Sep. 12, 2023

(54) BROADCAST FRAME WITH FEEDBACK

(71) Applicants: SONY GROUP CORPORATION, Tokyo (JP); SONY CORPORATION OF AMERICA, New York, NY (US)

(72) Inventors: Liangxiao Xin, San Jose, CA (US); Mohamed Abouelseoud, San Francisco, CA (US)

(73) Assignees: SONY GROUP CORPORATION, Tokyo (JP); SONY CORPORATION OF AMERICA, New York, NY (US)

(*) Notice: Subject to any disclaimer, the term of this patent is extended or adjusted under 35 U.S.C. 154(b) by 128 days.

(21) Appl. No.: 17/509,011

(22) Filed: Oct. 24, 2021

(65) Prior Publication Data
US 2022/0201591 A1 Jun. 23, 2022

Related U.S. Application Data

(60) Provisional application No. 63/126,588, filed on Dec. 17, 2020.

(51) Int. Cl.
*H04W 48/10* (2009.01)
*H04W 48/16* (2009.01)
*H04W 72/20* (2023.01)
*H04W 74/08* (2009.01)
*H04W 84/12* (2009.01)

(52) U.S. Cl.
CPC ........... *H04W 48/10* (2013.01); *H04W 48/16* (2013.01); *H04W 72/20* (2023.01); *H04W 74/0816* (2013.01); *H04W 84/12* (2013.01)

(58) Field of Classification Search
None
See application file for complete search history.

(56) References Cited

U.S. PATENT DOCUMENTS

| 10,638,253 | B1 | 4/2020 | Parkvall |
| 11,012,932 | B2* | 5/2021 | Gan ................ H04W 48/08 |
| 2015/0359008 | A1 | 12/2015 | Wang |
| 2016/0197655 | A1 | 7/2016 | Lee |
| 2018/0279209 | A1 | 9/2018 | Fang |
| 2018/0310247 | A1* | 10/2018 | Chu ................ H04W 52/0235 |
| 2019/0200289 | A1 | 6/2019 | Panje |

FOREIGN PATENT DOCUMENTS

EP 3277054 B1 4/2019

* cited by examiner

*Primary Examiner* — Hong S Cho
(74) *Attorney, Agent, or Firm* — O'BANION & RITCHEY LLP; John P. O'Banion

(57) ABSTRACT

Stations (STAs) in the network transmit broadcast frames which incorporate sharing information about specific parameter settings in the basic service set (BSS). Updates are transmitted to the other STAs when parameter settings change, which include version information about the parameter settings. A STA receiving an update records version information, which is incorporated in any response or broadcast back to the transmitting station to indicate that the specific update was properly received. The transmitting STA can indicate which other STAs are to provide feedback to the update information. The sharing information, or indicated portions thereof, may be shared with overlapping BSS STAs as well.

19 Claims, 22 Drawing Sheets

FIG. 1
(Prior Art)

| Frame Control | Duration | RA | TA | BSS ID | Sequence Control | Beacon Frame Body | FCS |

FIG. 2
(Prior Art)

| Element ID | Length | Element ID EXtension | Information |

FIG. 3
(Prior Art)

Trigger frame

| Frame Control | Duration | RA | TA | Common Info | User Info | ... | User Info | FCS |

Common Info field

| Trigger Type | UL Length | More TF | CS Required | UL BW | GI And LTF Type | MU MIMO HE LTF Mode | Number of HE-LTF Symbols and Midamble Periodicity | UL STBC |

| LDPC Extra Symbol Segment | AP TX Power | Pre-FEC Padding Factor | PE Disambiguity | UL Spatial Reuse | Doppler | HE-SIG-A2 Reserved | Reserved | Trigger dependent common info |

FIG. 4 (Prior Art)

User Info field

| AID12 | RU Allocation | UL FEC Coding Type | UL HE-MCS | UL DCM | SS Allocation/ RA-RU Information | UL Target RSSI | Reserved | Trigger dependent user info |

FIG. 5 (Prior Art)

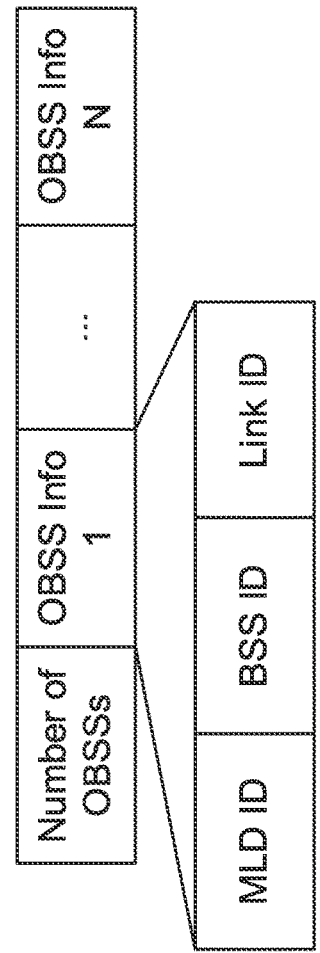

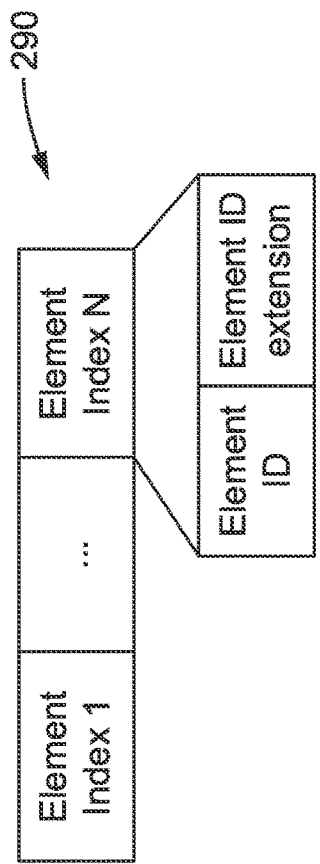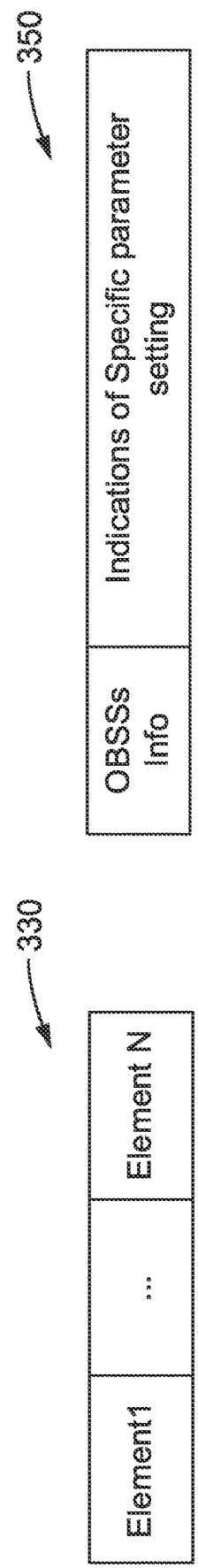
FIG. 18
FIG. 19
FIG. 20
FIG. 21

| Frame Control | Duration | RA | TA | BSS ID | Sequence Control | Triggered Response Requests | FCS |

FIG. 24

| Frame Control | Duration | RA | Latest Received Update Sequences | FCS |

FIG. 25

| Frame Control | Duration | RA | Update Sequence Receive Indication | FCS |

FIG. 26

BROADCAST FRAME WITH FEEDBACK

CROSS-REFERENCE TO RELATED APPLICATIONS

This application claims priority to, and the benefit of, U.S. provisional patent application Ser. No. 63/126,588 filed on Dec. 17, 2020, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless local area networks using Carrier Sense Multiple Access/Collision Avoidance (CSMA/CA) channel access, and more particularly to providing broadcast feedback in WLANs having Overlapped Basic Service Sets (OBSSs).

2. Background Discussion

In current wireless technologies, a station (STA) can use beacons to broadcast its Basic Service Set (BSS) capability and parameter settings to other STAs. However, there are limitations of this beacon use in the current IEEE 802.11 protocols which reduce overall coordination and thus efficiency of the network.

According, a need exists for improved broadcast feedback mechanisms. The present disclosure addresses that need and provides additional benefits.

BRIEF SUMMARY

The apparatus and protocol of the present disclosure allows an Access Point (AP) to broadcast beacon frames and share information with stations (STAs) in its own Basic Service Set (BSS) as well as in Overlapped Basic Service Sets (OBSSs). The STA is able to specify which information and which OBSS STAs it intends to share with. The proposed technology allows an AP to indicate the latest beacon frame it received from OBSS APs in its beacon frame. When the beacon is received by the OBSS APs, these APs can determine whether the latest updated information is received by the AP. The proposed technology allows an AP to request feedback from other STAs. The AP is able to specify the STAs that are to provide feedback and to pre-allocate the channel resources necessary for those feedback transmissions.

Since coordination and synchronization between APs can provide an important aspect in Wi-Fi networks, the beacon can be a suitable candidate for sharing information between multiple BSSs. The disclosure provides a mechanism to improve the usage of beacon frames to facilitate information sharing between BSSs.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1 is a data field diagram of a beacon frame format defined in IEEE 802.11.

FIG. 2 is a data field diagram of a Beacon Frame Body as was contained in the beacon frame of FIG. 1, as defined in IEEE 802.11.

FIG. 3 is a data field diagram of a trigger frame defined in IEEE 802.11.

FIG. 4 is a data field diagram of a Common Info field, for the Trigger Frame shown in FIG. 3, as defined in IEEE 802.11.

FIG. 5 is a data field diagram of a User Information field, of the Trigger Frame shown in FIG. 3, as defined in IEEE 802.11.

FIG. 15 is a data field diagram of a format for an Elements Shared with OBSS element according to at least one embodiment of the present disclosure.

FIG. 16 is a data field diagram of a format for the Elements Shared with OBSSs field seen in FIG. 15, according to at least one embodiment of the present disclosure.

FIG. 17 is a data field diagram of a format for the OBSSs Info field from FIG. 16, according to at least one embodiment of the present disclosure.

FIG. 18 is a data field diagram of an Elements Index List field, which was depicted in FIG. 16, according to at least one embodiment of the present disclosure.

FIG. 19 is a data field diagram of another format for the Elements Shared with OBSSs field according to at least one embodiment of the present disclosure.

FIG. 20 is a data field diagram of a format for the Elements List field, as was seen in FIG. 19, according to at least one embodiment of the present disclosure.

FIG. 21 is a data field diagram of another format for the Elements Shared with OBSSs field according to at least one embodiment of the present disclosure.

FIG. 24 is a data field diagram of an Update Sequence Feedback Request frame according to at least one embodiment of the present disclosure.

FIG. 25 is a data field diagram of an update sequence feedback frame according to at least one embodiment of the present disclosure.

FIG. 26 is a data field diagram of another format for an Update Sequence Feedback frame according to at least one embodiment of the present disclosure.

DETAILED DESCRIPTION

1. Introduction

Figure 6:
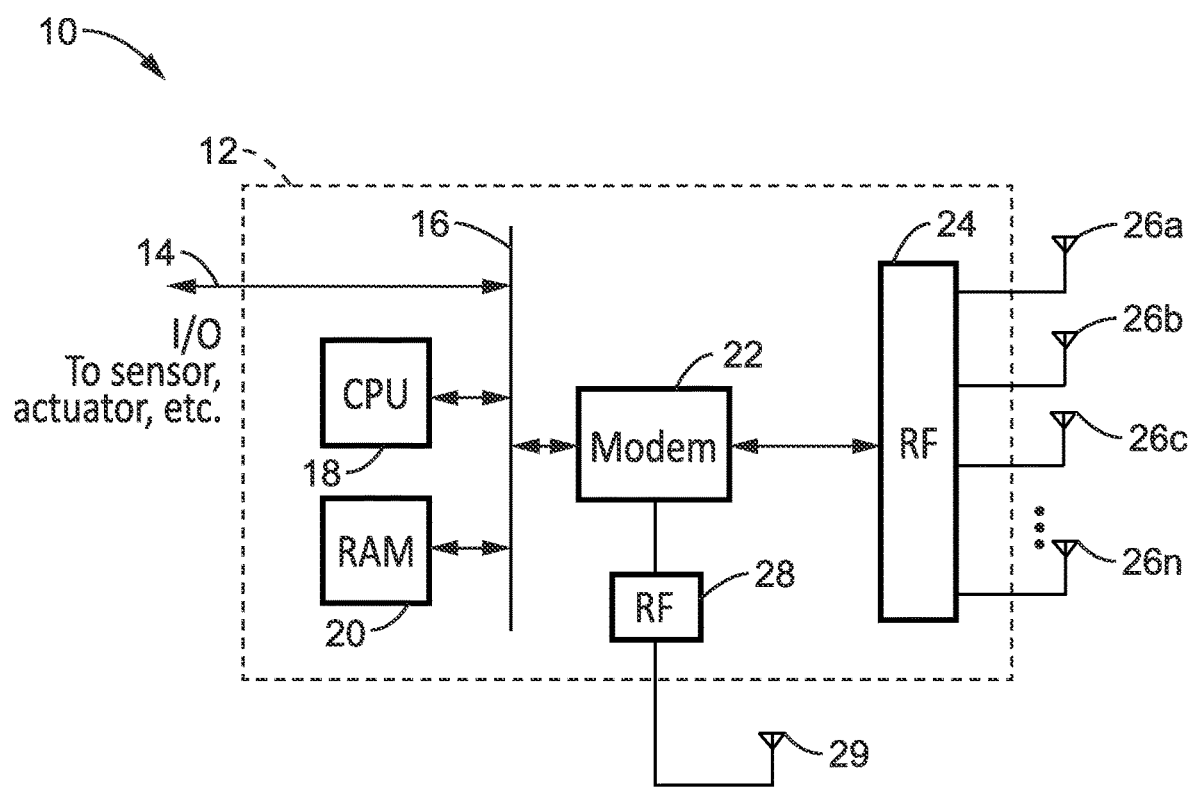
FIG. 6 is a hardware block diagram of wireless station hardware according to at least one embodiment of the present disclosure.

The disclosed technology provides a feedback mechanism when sharing information between an AP and its BSS as well as OBSSs. In at least one embodiment, information is shared and updated using some type of beacon frame. The STA is able to specify which information and which OBSS STAs it intends to share with. The AP can also indicate the latest beacon frame it received from OBSS APs in its beacon frame. When the beacon is received by the OBSS APs, they can thus determine whether the latest updated information was received by the AP. An AP can request feedback from other STAs, and is able to specify the STAs to send feedback to as well as to allocate channel resources for accommodating those feedback transmissions.

First, a short summary on how existing IEEE 802.11 WLANs use beacon frame sharing.

2. Existing 802.11 Systems

2.1. Frame Beacons in IEEE 802.11

2.1.1. Beacon Format

FIG. 1 illustrates the content of a beacon frame format in IEEE 802.11. A Frame Control field indicates the type of frame. A Duration field contains NAV information used for CSMA/CA channel access. An RA field contains an address for the recipient of the frame. A TA field contains the address for the STA that transmitted the frame. A BSS ID field is the label to identify one BSS from others. A Sequence control field contains a fragment number and the sequence number of the packet. A Regular Beacon Frame Body field has the same content of the frame body as in the regular beacon frame.

2.1.2. Element (Beacon Frame Body)

FIG. 2 illustrates the content of the Beacon Frame Body element.

An Element ID and Element ID extension fields provide identification of the element to indicate the content of the information field. A Length field indicates the length of the element. An Information field carries the information according to the Element ID and Element ID extension fields.

2.1.3. Trigger Frame

FIG. 3 illustrates the content of a trigger frame. A Frame Control field indicates the type of the frame. A Duration field contains NAV information used for CSMA/CA channel access. An RA field contains an address for the recipient of the frame. A TA field contains the address of the STA which transmitted the frame.

FIG. 4 illustrates a Common Info field, of the Trigger Frame shown in FIG. 3, which includes the information for each STA. The format is shown with the fields: Trigger Type, UL Length, More TF, CS Required, UL BW, GI and LTF Type, MU MIMO HE LTF Mode, Number of HE-LTF Symbols and Midamble Periodicity, UL STBC, LDPC Extra Symbol Segment, AP TX Power, Pre-FEC Padding Factor, PE Disambiguity, UP Spatial Reuse, Doppler, HE-SIG-A2 Reserved, and Trigger Dependent Common Info.

FIG. 5 illustrates a User Information field, of the Trigger Frame shown in FIG. 3, which provides the separate resource block allocation information to each user. The format is shown with the fields: AID12, RU Allocation, UI FEC Coding Type, UL HE-MCS, UL DCM, SS Allocation/RA-RU Information, UL Target RSSI, Reserved, and Trigger Dependent User Info.

3. Problem Statement

Current IEEE 802.11 devices request coordination between multiple APs or multiple BSSs, as it is important for those APs to share information between each other. The failure of information sharing could cause the failure of the coordination between APs and BSSs. Therefore, the disclosure provides a mechanism for the AP to determine whether information sharing was successful or not. In at least one embodiment the AP uses a broadcast frame, such as beacon frame, to share information with other APs.

However, using the current 802.11 beacon frame has the following limitations. The information in the beacon frame cannot be used by the STAs in the OBSSs. The broadcast beacon frame is not able to receive any feedback from other STAs to indicate whether the beacon frame was received successfully or not.

4. Contribution of the Present Disclosure

The disclosure describes a mechanism to allow an AP to request feedback from other STAs for its transmitted broadcast frame. The AP is able to specify the STAs to send feedback to and allocate the channel resource for feedback transmission.

The disclosed technology allows an AP to broadcast beacon frames and share information even with OBSSs. The STA is able to specify which information and which OBSS STAs it intends to share with.

The proposed technology allows an AP to indicate the latest beacon frame it received from OBSS APs in its beacon frame. When the beacon is received by the OBSS APs, it can discern whether the latest update information was received by the AP.

5. Embodiment

5.1. Station Hardware Configuration

FIG. 6 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implement the communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. The present disclosure is primarily directed at the sub 6 GHz band.

It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

Figure 7:
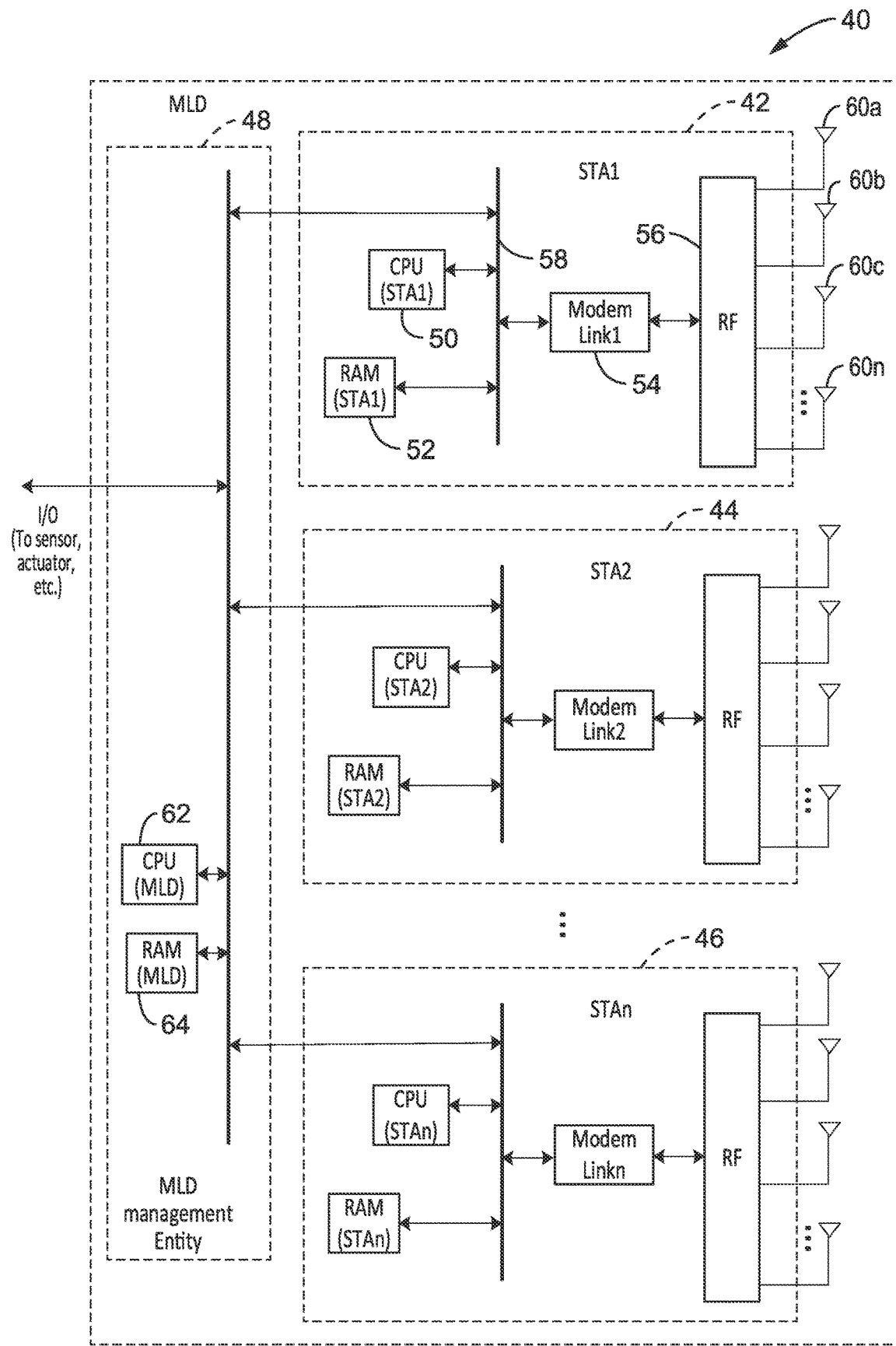
FIG. 7 is a hardware block diagram of a station configuration, such as contained in Multi-Link Device hardware, according to at least one embodiment of the present disclosure.

FIG. 7 illustrates an example embodiment 40 of a Multi-Link Device (MLD) hardware configuration. Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implement communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

5.2. Network Topology for Consideration

Figure 8:
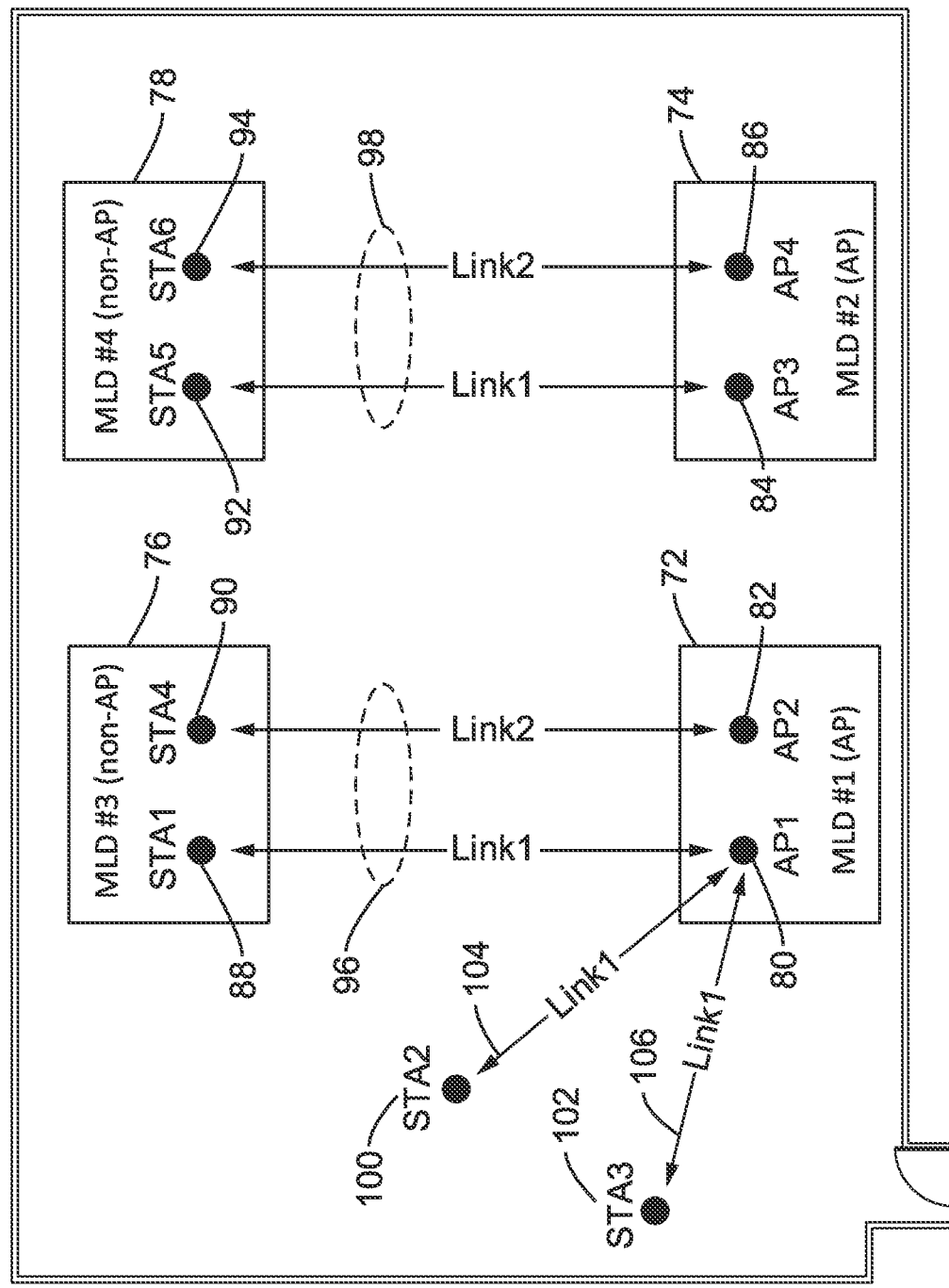
FIG. 8 is a topology of a WLAN having six STAs and two APs across two BSS according to at least one example of the present disclosure.

FIG. 8 illustrates an example embodiment 70 as an aid for explaining the goals of the proposed technology. A MLD is a device that has more than one affiliated STA and has one MAC service access point (SAP) to logical link control (LLC), which includes one MAC data service. In this example it is assumed there are 10 STAs, with 8 of them consisting of 4 MLDs in a local area (depicted for example as a meeting room). AP1 80 and AP2 82 are affiliated with MLD #1 72. AP3 84 and AP4 86 are affiliated with MLD #2 74. STA1 88 and STA4 90 are affiliated with MLD #3 76. STA5 92 and STA6 94 are affiliated with MLD #4 78. MLD #1 is connected to MLD #3 by a pair of links 96, exemplified by Link1 and Link2. MLD #2 is connected to MLD #4 by a pair of links 98, exemplified by Link1 and Link2.

STA1 through STA3 are associated with AP1 over link1. STA4 is associated with AP2 over link2. STA5 and STA6 are associated with AP3 and AP4 over Link1 and Link2, respectively. All STAs are exemplified using CSMA/CA for random channel access.

5.3. Broadcast Frame with Feedback 5.3.1. Flow Diagrams

A STA sets an update sequence to indicate the update of its specific parameter settings. The change of the update sequence of a STA represents the update of those specific parameter settings of that STA. A transmitter STA can broadcast a type of frame, referred to herein as a sharing frame, which carries and shares its specific parameter settings with receiver STAs. The transmitter STA can transmit the sharing frame intermittently (e.g., periodically, or in response to events), with the update of those specific parameter settings of the transmitter STA to share with the receiver STAs.

A basic service set is a subgroup, within a service set, of devices that share physical-layer medium access (MAC) characteristics (e.g., radio frequency, modulation scheme, security settings) such that they are wirelessly networked. While each BSS may have somewhat different capabilities and parameter settings which determine the operations within that BSS. In this disclosure, the capabilities are considered subsumed within the term of specific parameter settings. These parameter settings include Basic Service Set parameters and are shared, such as in beacon frames to allow a station desiring to join the BSS to set its parameters to match that announced in the beacon frame, so that it may join the network and request service from AP. For example existing parameter settings include the highest level settings contained in the frame control field, which set the highest level protocol, type of frame, subtype, distribution system, handling of fragment and retry bits, power management, protected frames and data frames, as well as in other fields depending on the type of frame and the capabilities of a device. The parameter settings can determine both interpretation and use of other frames and fields being communicated.

In certain embodiments examples of these specific parameter settings can be the elements, such as a TWT element, in the beacon for R-TWT scheduling announcement. In IEEE 802.11be, the AP can schedule restricted TWT (R-TWT) SPs to reserve a channel resource for prioritizing the latency sensitive traffic of the member STAs of the R-TWT. The AP announces the R-TWT scheduling by transmitting a TWT element in its beacon. After the STA receives this beacon, it can request to be a member of the R-TWT and get service during the R-TWT SPs. The AP may update the R-TWT scheduling (e.g., change the time of TWT SP) through a beacon and the STA needs to get this update in time to ensure it can obtain service. Therefore, the AP needs to make sure the STA receives the beacon.

The AP of OBSS may also schedule R-TWT SPs for its associated STAs that are the R-TWT members. If the R-TWT SPs between the BSS and OBSS are overlapped, it may increase the probability of packet collision occurring during the overlapped time. One of the APs has to adjust its R-TWT scheduling to avoid this. Therefore, the AP needs to know the R-TWT scheduling of the R-TWT scheduling of the OBSS AP by receiving the TWT element in the beacon sent by the OBSS AP, and vice versa.

Herein the term "Specific Parameter Settings" encompasses regular 802.11 parameter settings as well as additional settings which are described in the present disclosure.

A sharing frame can carry the update sequence of the transmitter STA to indicate the update of the specific parameter settings of the transmitter STA. If the transmitter STA transmits two sharing frames with different update sequences (e.g., different value for the update sequence), then the specific parameter settings of the transmitter STA carried by those two sharing frames are different. The transmitter STA can also transmit a sharing frame carrying the update sequence of the other STAs (e.g., receiver STAs) to indicate the latest update of the same specific parameter settings of those STAs it received.

For example, the sharing frame can be a beacon frame as defined in IEEE 802.11 and a transmitter AP can transmit the beacon frame periodically to share its BSS parameter settings with other receiver APs. It is possible that the receiver APs can be OBSS APs with respect to the transmitter AP. The transmitter AP can set an update sequence for its BSS parameter settings in the beacon frame to indicate the update of its BSS parameter settings. The transmitter AP can also share the update sequences of the receiver APs in the frame to indicate the latest BSS parameter settings with neighboring receiver APs it recognizes.

Figure 9A:
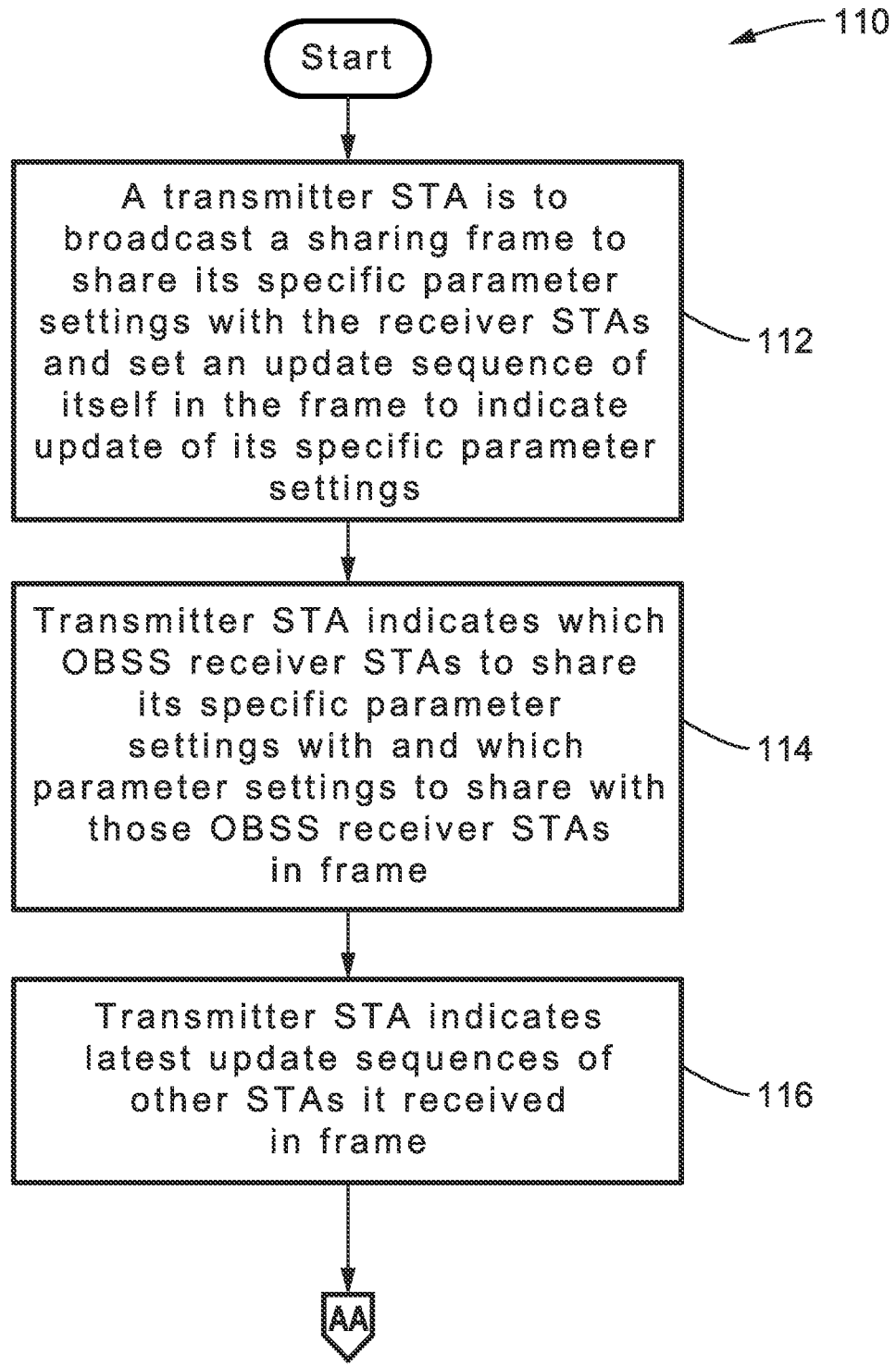
FIG. 9A and FIG. 9B is a flow diagram of a transmitter STA broadcasting a sharing frame which is carrying update sequences according to at least one embodiment of the present disclosure.
Figure 9B:
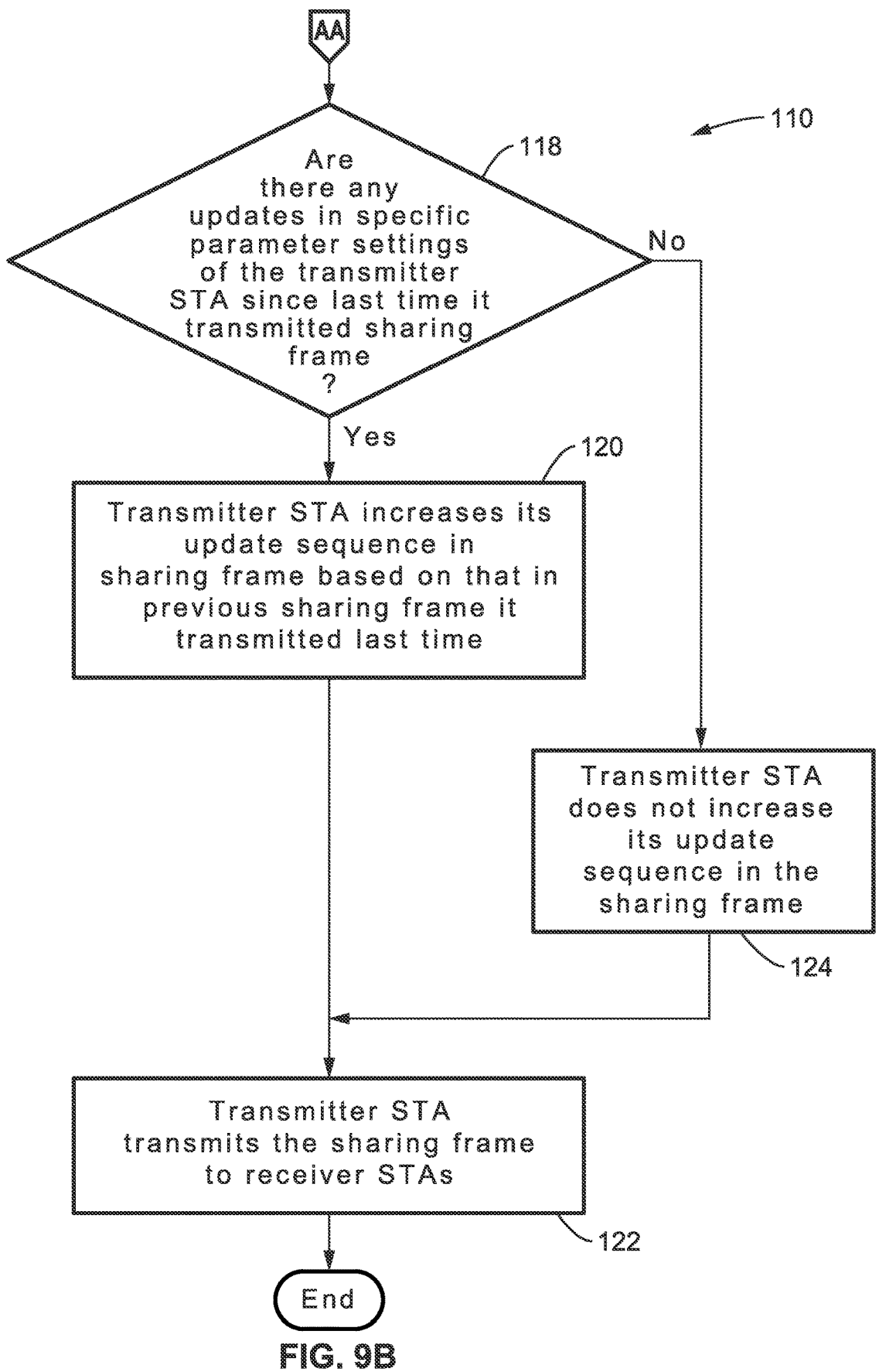

FIG. 9A and FIG. 9B illustrate an example embodiment 110 of a transmitter STA broadcasting a sharing frame which is carrying update sequences.

A transmitter STA broadcasts 112 a sharing frame to share its specific parameter settings with the receiver STAs, it sets an update sequence in the frame to indicate the update of its specific parameter settings. If a receiver STA receives a sharing frame from the transmitter and the update sequence of the transmitter STA is not the same as that in the previous sharing frame the receiver STA received from the transmitter STA, then the receiver STA recognizes that the transmitter STA has an update for its specific parameter settings.

The transmitter STA can also optionally indicate 114 which OBSS receiver STAs to share its specific parameter settings with and which parameter settings to share with those OBSS receiver STAs in the frame. When the intended OBSS receiver STAs receive the frame, it can use the information in the frame to determine how to share with the transmitting STA.

The transmitter STA can indicate 116 the latest update sequences of the other STAs it received in the sharing frame. When the intended receiver STAs receive the frame, they can determine whether the latest update of their specific parameter settings is received by the transmitter STA.

A check 118 in FIG. 9B determines if there are any updates in the specific parameter settings of the transmitter STA since the last time the transmitter STA transmitted the sharing frame. If there are updates, then at block 120 the transmitter STA increases its update sequence (e.g., by changing the value in the sequence control field of the frame) to indicate an update has occurred, in the sharing frame based on the value of the sharing frame it previously transmitted. Thus, the update sequence could be the sequence number or set in the sequence control field.

Otherwise, if there were no updates, then in block 124 the transmitter does not increase its update sequence value in the sharing frame. Then, in either case at block 122 the transmitter STA transmits (broadcasts) the sharing frame to the receiver STAs. It should be noted that the transmitter STA can also groupcast the sharing frame and use the update sequence in the sharing frame as described for the flowchart. It should also be noted that it is possible that the update sequence of the transmitter STA is not increased (incremented) because it receives the change of the update sequences of other STAs.

Figure 10A:
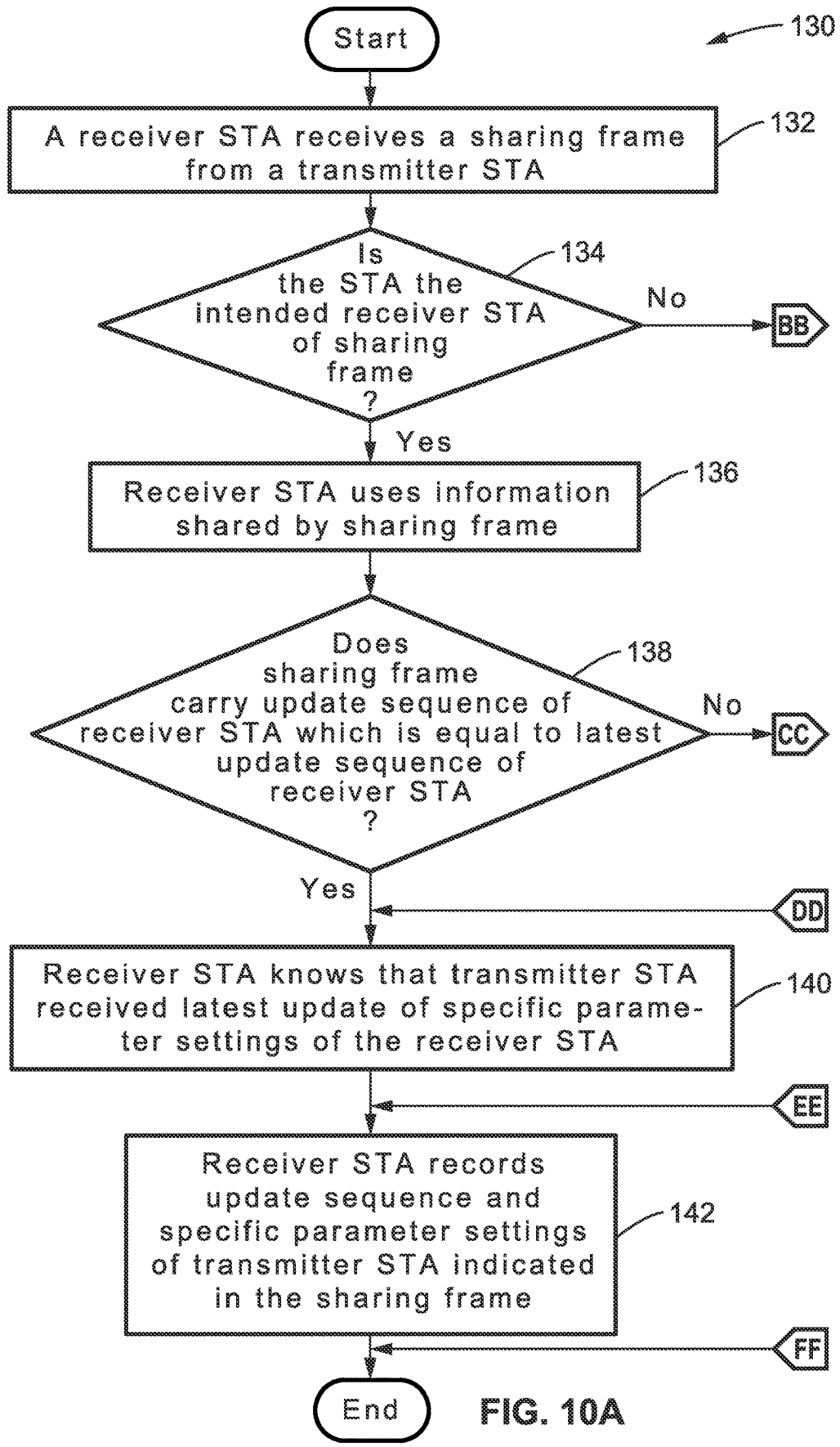
FIG. 10A and FIG. 10B is a flow diagram of a receiver STA receiving a sharing frame carrying update sequences and specific parameter settings of the transmitter STA according to at least one embodiment of the present disclosure.
Figure 10B:
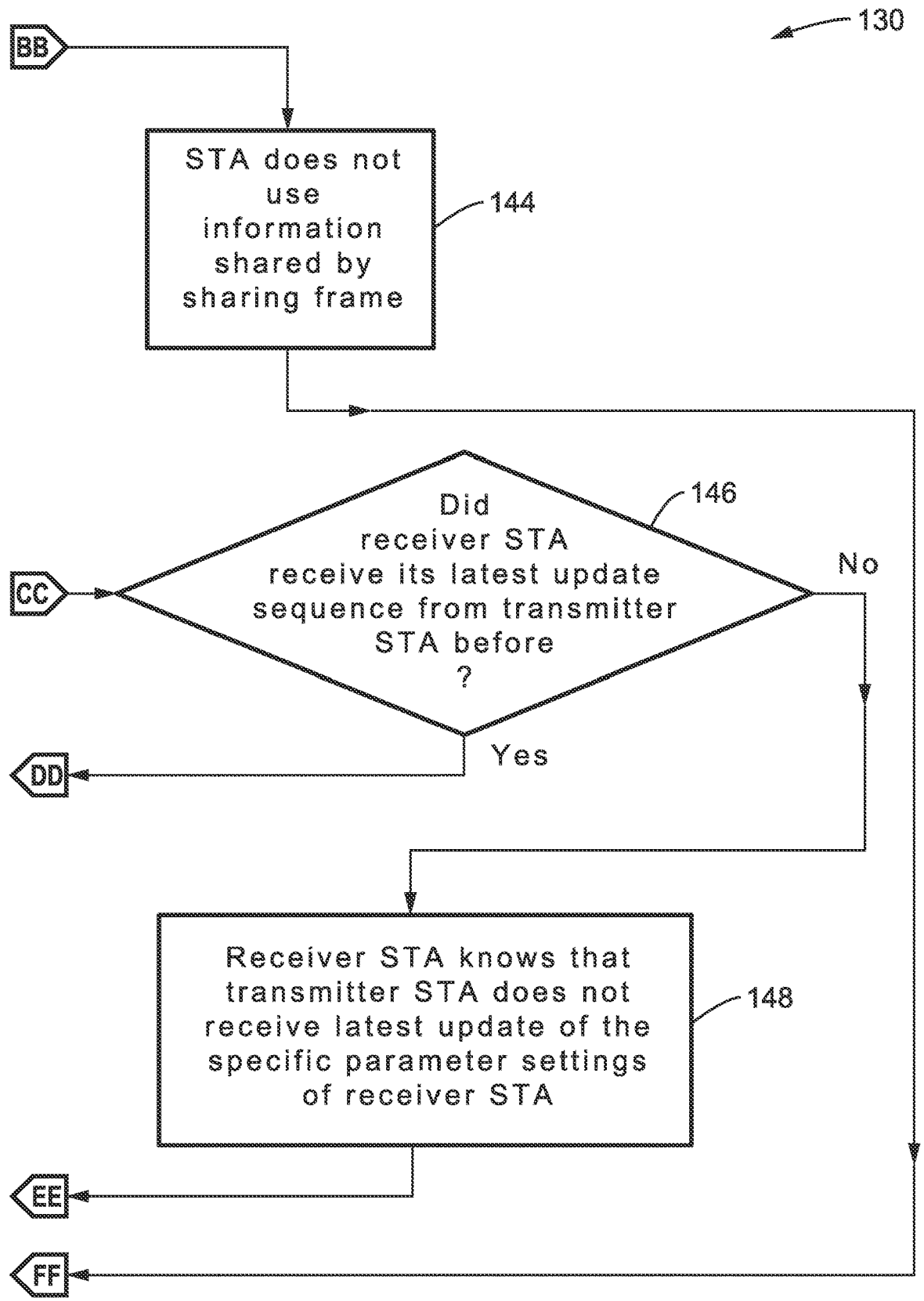

FIG. 10A and FIG. 10B illustrate an example embodiment 130 for a receiver STA receiving a sharing frame carrying update sequences and specific parameter settings of the transmitter STA.

In block 132 a receiver STA receives a sharing frame from a transmitter STA, and a determination 134 is made identifying whether it is the intended receiver of the sharing frame.

If the receiver STA is the intended receiver STA of the sharing frame, then the receiver uses information 136 shared by the sharing frame. Then a check 138 determines if the sharing frame carries the update sequence of the receiver STA which is equal to the latest update sequence of the receiver STA.

If it is determined that the sharing frame carries the latest update sequence of the receiver then at block 140 the receiver STA recognizes that the transmitter STA received the latest update of the specific parameter settings of the receiver STA. Then in block 142 the receiver STA also records the update sequence of the transmitter STA and the specific parameter settings of the transmitter STA indicated in the sharing frame.

Returning to block 134, if the STA is not the intended receiver STA, then at block 144 in FIG. 10B, the STA does not use information shared by the sharing frame, and execution ends.

Considering block 138, if the sharing frame does not carry the update sequence which is equal to the latest update sequence of the receiver STA, then execution moves to decision block 146 in FIG. 10B. Block 146 determines if the receiver STA previously received its latest update sequence from the transmitter STA. If it did receive the latest update, then execution moves to block 140 in FIG. 10A. Otherwise, execution moves to block 148 with the receiver STA recognizing that the transmitter STA has not received the latest update of the specific parameter settings of the receiver STA and execution moves to block 142 in FIG. 10A.

Figure 11:
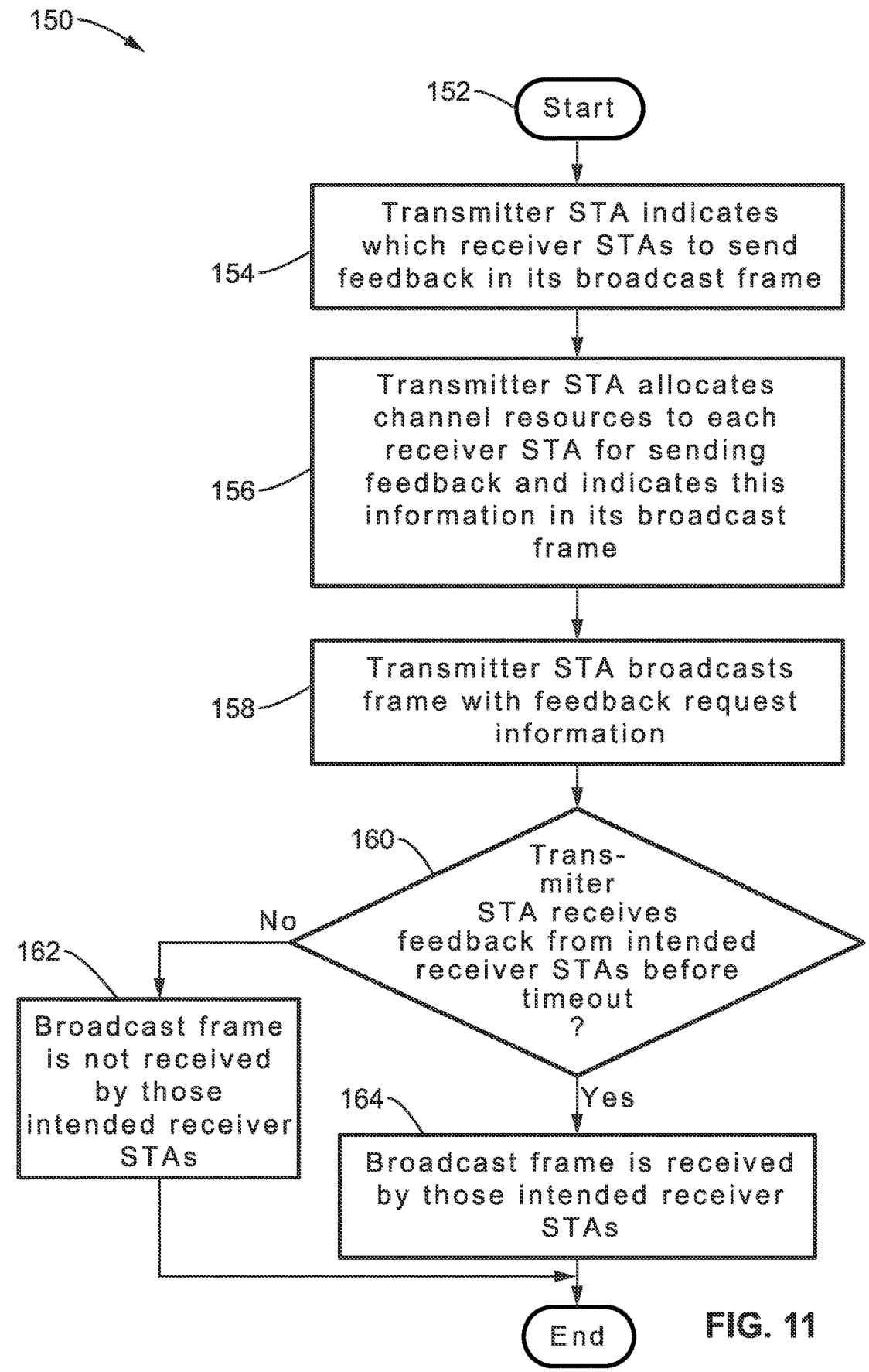
FIG. 11 is a flow diagram of a transmitter STA requesting feedback for a broadcast frame from at least some receiver STAs according to at least one embodiment of the present disclosure.

FIG. 11 illustrates an example embodiment 150 of a transmitter STA requesting feedback for a broadcast frame from some receiver STAs. In block 154 when a transmitter STA requests feedback (e.g., ACK or BA frame) for its broadcast frame, e.g., a sharing frame, from some receiver STAs, it indicates which receiver STAs to send feedback in its broadcast frame. The transmitter STA also allocates 156 the channel resources for each receiver STA sending the feedback and indicates this information in its broadcast frame. The transmitter STA then broadcasts 158 the frame with the feedback request information.

A check 160 determines if the transmitter STA has received feedback from intended receiver STAs before timeout. If the feedback was received, then at block 164 the transmitter STA can recognize that the broadcast frame was received by those intended receiver STAs. For example, the transmitter STA can receive an ACK or BA frame from an intended receiver STA indicating that the broadcast frame was received correctly. It should be noted that it is also possible that the transmitter STA receives a BA frame from a receiver STA indicating that the BA frame was not received correctly.

Otherwise, if the transmitter STA does not receive feedback from the intended receiver STAs, then at block 162 the transmitter STA recognizes that the broadcast frame was not received correctly by those intended receiver STAs. In at least one embodiment, the broadcast frame can be replaced by the groupcast frame.

Figure 12:
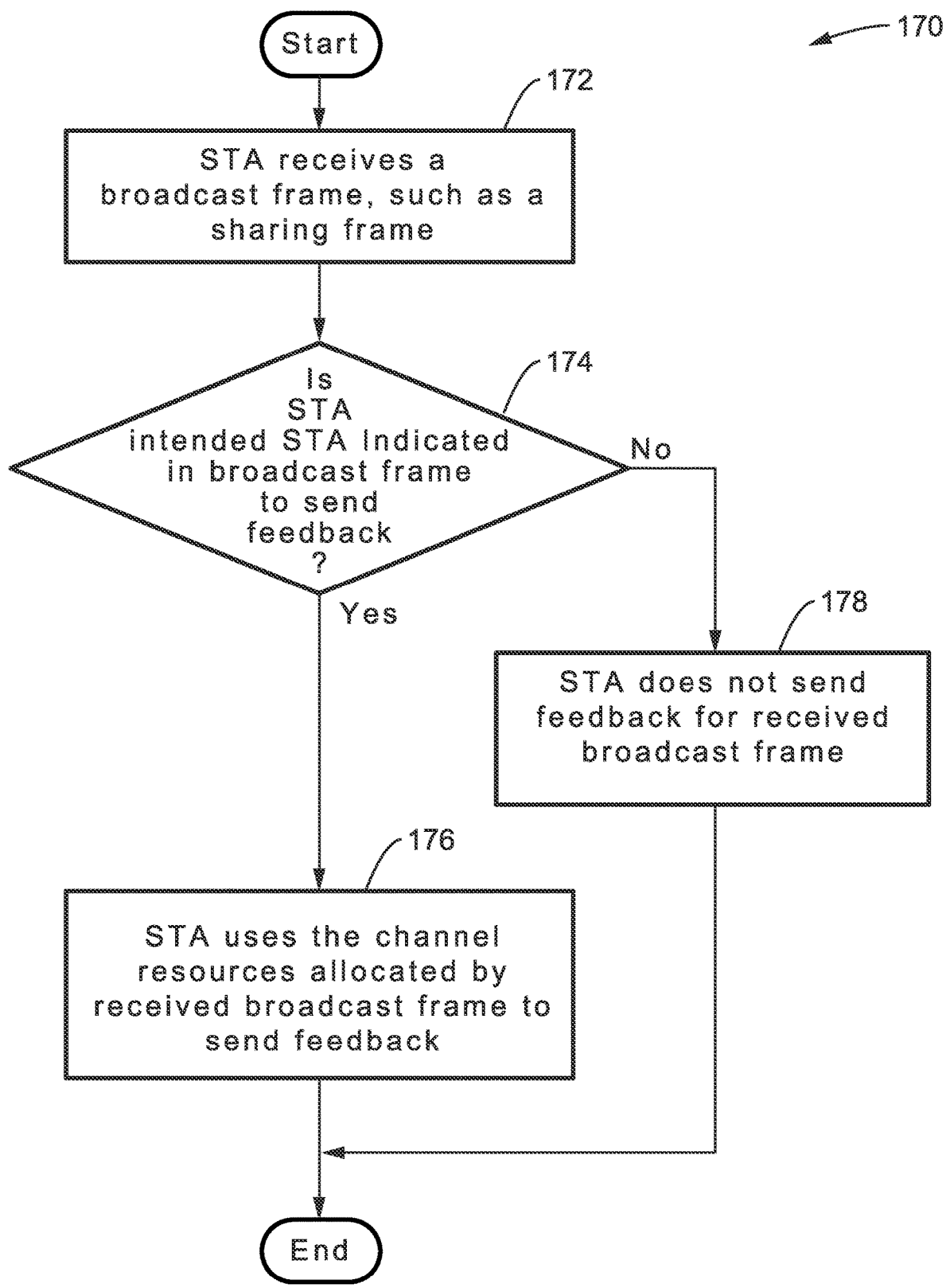
FIG. 12 is a flow diagram of a STA sending feedback for a received broadcast frame according to at least one embodiment of the present disclosure.

FIG. 12 illustrates an example embodiment 170 of a STA sending feedback for a received broadcast frame. When a STA receives a broadcast frame 172, e.g., a sharing frame, then a check 174 determines whether it is the intended STA indicated in the received broadcast frame to send feedback, e.g., ACK or BA frame, for the broadcast frame.

If it is determined that it is the intended STA, then in block 176 it uses the channel resources allocated by the received broadcast frame to send feedback. Otherwise, if it is not the intended STA, then at block 178 the STA does not send feedback for the received broadcast frame. It will be noted that the broadcast frame can also be replaced by the groupcast frame in the flowchart.

5.3.2. Frame Format

Figure 13:
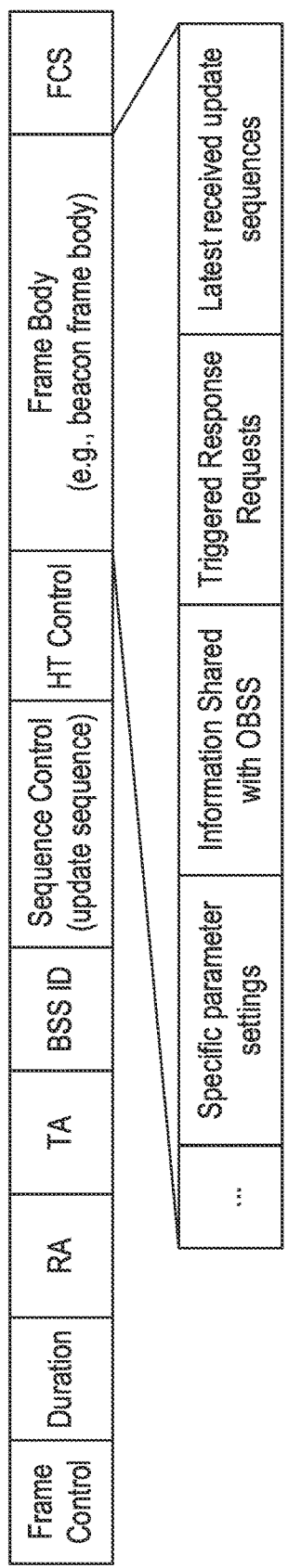
FIG. 13 is a data field diagram of a sharing frame format according to at least one embodiment of the present disclosure.

FIG. 13 illustrates an example embodiment 190 of a sharing frame format. A Frame Control field indicates the type of frame. A Duration field contains NAV information used for CSMA/CA channel access. An RA field contains an address for the recipient of the frame. A TA field contains the address of the STA which transmitted the frame. A BSS ID field provides a label to identify the BSS of the intended receiver (in broadcast frame, it is set to the BSSID of the transmitter). A Sequence control field contains the fragment number and the sequence number of the packet, which the transmitter STA sets to its update sequence. When there is an update of the specific parameter settings of the transmitter STA, the transmitter STA increases (e.g., increments or otherwise changes this value to indicate an update) this field the next time it transmits the frame. When a receiver STA receives this field which is different than that in the previous one from the same transmitter STA, the receiver STA discerns (detects, determines, or recognizes) that the specific parameter settings of the transmitter STA have been changed. That is, the receiver STA recognizes there is an update in the elements of specific parameter settings field in the frame. In at least one embodiment the transmitter STA may use a field other than the sequence control field to carry its update sequence in the sharing frame.

An HT control field can carry the information of which elements are being shared with OBSS STAs as is explained below in FIG. 14. An OBSS receiver can then determine which elements in the frame is shared with it.

The frame body can carry the following elements. A Specific Parameter Settings field for the transmitter STA setting this field to indicate its specific parameter settings. The transmitter STA can include elements or the fields that are not elements as defined in IEEE 802.11 in this field to indicate its parameter settings. For example, this field can carry the elements and the fields that could be carried by the beacon frame body as shown in FIG. 1 to indicate the BSS parameter settings of the transmitter STA. When the receiver STA receives this field, it thus has the parameter settings of the transmitter STA when it received this field.

Figure 14:
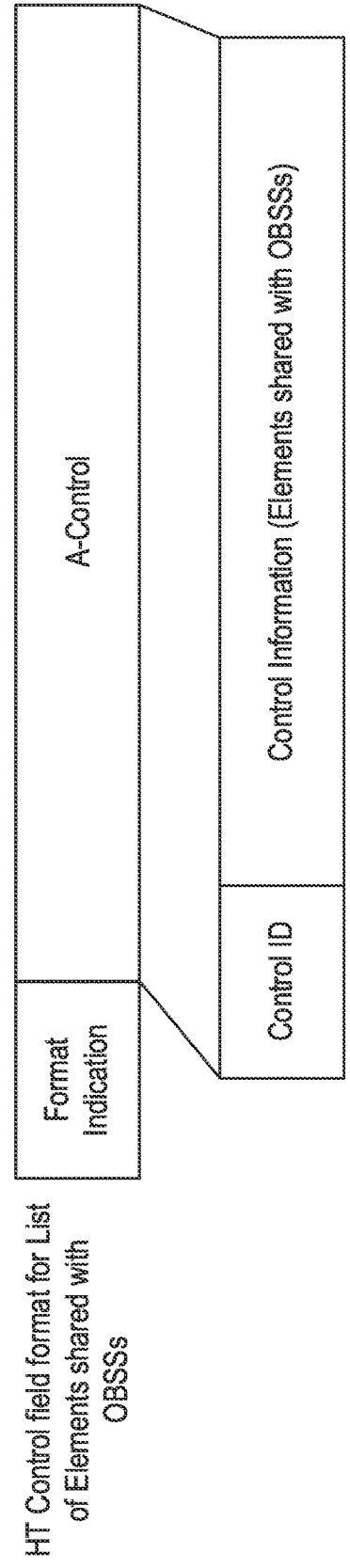
FIG. 14 is a data field diagram of a High Throughput (HT) Control field to carry the Elements shared with OBSSs field according to at least one embodiment of the present disclosure.

FIG. 14 illustrates an example embodiment 210 of an HT Control field to carry the Elements being shared with OBSSs. A Format Indication field indicates the variant following this field; in this case indicating that an A-Control field follows this field. The A-Control field is an Enhanced High Throughput (EHT) variant to carry different types of control information as defined in 802.11ax. A Control ID field indicates the type of information in the control information field. In this case it indicates the control information field carries elements shared with OBSSs. A Control Information field (Elements shared with OBSSs) field indicates which information (e.g., elements in the frame body) is shared with OBSS STAs. When a receiver receives this field, it can use the information (e.g., elements in the frame body)

listed in this field from the received frame. The format of this field can be as illustrated in FIG. 16, FIG. 19, or FIG. 21.

FIG. 15 illustrates an example embodiment 230 of information shared with OBSS element as the format of this element. An Element ID and Element ID extension fields provide identification of the element to indicate this element is Information shared in the OBSS element. A Length field indicates the length of the element. An Elements shared with OBSSs field indicates which information is shared with OBSS STAs. When a receiver STA receives this field, it can use the information listed in this field from the received frame. The format of this field can be as illustrated in FIG. 16, FIG. 19 or FIG. 21. It should be noted that it is possible that Information shared with the OBSS element carries multiple Elements shared with the OBSSs field.

FIG. 16 illustrates an example embodiment 250 showing a format for the Elements Shared with OBSSs field seen in FIG. 15. An OBSS Info field indicates which OBSS STAs that the information in the Elements shared with OBSSs field is shared with. The format of this field is illustrated in FIG. 17. It will be noted that in at least one embodiment, when this field is not present, then the information in the Elements Shared with OBSSs field is to be shared with any OBSS STAs.

A Specific Parameter Setting field is set by the transmitter STA to indicate the specific parameters shared with OBSS STAs indicated in the OBSSs Info field. For example, that field may comprise a field that is not an element defined in IEEE 802.11, such as Timestamp field, Beacon Interval field, Capability Information field.

An Elements Index List for Specific Parameter setting field lists the index of the elements as defined in IEEE 802.11 that is shared with OBSS STAs indicated in the OBSSs Info field. The format of this field is shown in FIG. 18. The receiver STA receives this field, from which it can determine which elements in the frame are shared with it.

FIG. 17 illustrates an example embodiment 270 format of the OBSSs Info field from FIG. 16. A Number of OBSS fields indicate the number of OBSS Info fields in the OBSSs Info field. In at least one embodiment, if this field is not present, then the OBSSs Info field only carries one or another fixed number of OBSS Info fields.

An OBSS Info field indicates the identification of the intended OBSS receiver STA. When an OBSS STA receives this field, it can identify whether it is the intended OBSS STA by comparing its own identification with those in the OBSS Info field. It is also possible to use at least one of the following fields to identify the intended OBSS receiver STA.

A MLD ID field provides the identification of the MLD. When this field is present in the OBSSs Info field of an Elements Shared with OBSSs field as shown in FIG. 16, FIG. 19 and FIG. 21, the information carried by the frame, such as shown in FIG. 13, is shared with the STAs affiliated with the MLD indicated in this field.

Figure 23:
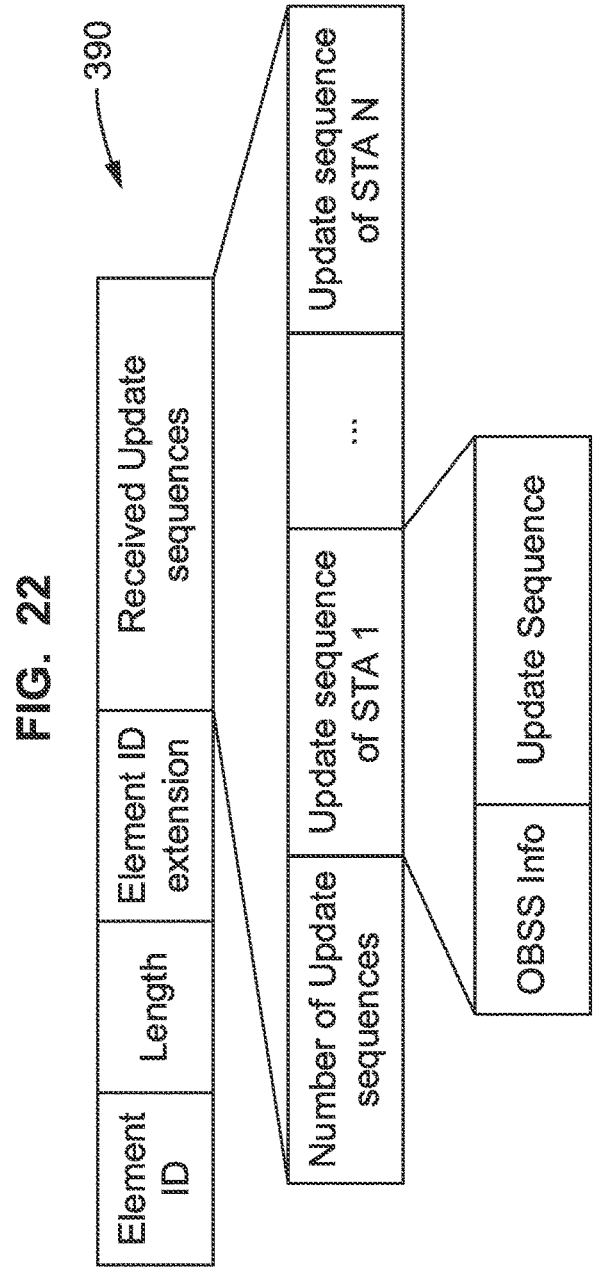
FIG. 23 is a data field diagram of a format for the Latest Received Update Sequences element according to at least one embodiment of the present disclosure.

When this field is present in the OBSSs Info field of an Update Sequence of OBSS field in a Latest Received Update Sequences element as shown in FIG. 23, this field indicates which MLD the update sequence in the same Update sequence of OBSS field is received from.

In at least one variation, the MLD ID field can be set to a value to represent any MLD. A BSS ID field provides an identification of the OBSS. When this field is present in the OBSSs Info field of an Elements shared with OBSSs field as shown in FIG. 16, FIG. 19 and FIG. 21, then the information carried by the frame, such as shown in FIG. 13, is shared with the STAs in the OBSS indicated in this field.

When this field is present in the OBSSs Info field of an Update sequence of OBSS field in a Latest Received Update Sequences element as shown in FIG. 23, this field indicates which OBSS update sequence is the same Update sequence that the OBSS field was received from. In at least one variation, this field can be used to carry the SSID of the OBSS or the AID or MAC address of the OBSS STA. In addition, it is possible to set the BSS ID field to a value to represent any BSS.

A BSS ID field provides the identification of the OBSS. When this field is present in the OBSSs Info field of an Elements shared with OBSSs field as shown in FIG. 16 and FIG. 19 and FIG. 21, the information carried by the frame, such as shown in FIG. 13, is shared with the STAs in the OBSS indicated in this field.

When this field is present in the OBSSs Info field of an Update sequence of OBSS field in a Latest Received Update Sequences element as shown in FIG. 23, this field indicates which OBSS the update sequence in the same Update sequence of OBSS field is received from.

It should be noted that this field can be used to carry the SSID of the OBSS or the AID or MAC address of the OBSS STA. It should also be noted that it is possible to set the BSS ID field to a value to represent any BSS.

A Link ID field provides an identification of the link. This field can be present in the OBSSs Info field of an Elements Shared with OBSSs field as shown in FIG. 19 to indicate the information in the Elements shared with OBSSs field is used for the operation on the link indicated in the Link ID field.

When this field is present in the OBSSs Info field of an Update sequence of OBSS field in a Latest Received Update Sequences element as shown in FIG. 23, this field indicates which Link the update sequence in the same Update sequence of OBSS field is received from.

In at least one alternative implementation, the Link ID field can be set to a value to represent selection of any or all links.

FIG. 18 illustrates an example embodiment 290 of the Elements Index List field, that was depicted in FIG. 16. This can carry at least one Element Index field. Each element index field contains the Element ID and the element ID extension field to indicate the corresponding element. When this field is in the Elements shared with OBSSs field as shown in FIG. 16, each element Index field indicates the element that is shared with the corresponding OBSS STAs. The element ID and the element ID extension fields are set to the same values of the corresponding element, such as defined in IEEE 802.11. For example, if the element ID and the element ID extension field is the same as those in the Latest Received Update Sequences element as shown in FIG. 23, then it indicates that the information in Latest Received Update Sequences element is shared with the corresponding OBSSs.

FIG. 19 illustrates an example embodiment 310 of another format for the Elements shared with OBSSs field. An OBSS Info field indicates which OBSSs that the information in the Elements Shared with OBSSs field is shared with. The format of this field can be as illustrated in FIG. 17. In at least one implementation if this field is not present, the information in the Elements Shared with OBSSs field is shared with any OBSSs.

One or more Specific Parameter setting fields (e.g., exemplified with 1 through N fields) is set by the transmitter STA to indicate the specific parameter fields shared with OBSS STAs indicated in the OBSSs Info field. For example, those fields can be a field that is not an element as defined in IEEE 802.11, such as Timestamp field, Beacon Interval field, Capability Information field.

An Elements List for Specific parameter setting field lists the elements that are shared with OBSS STAs indicated in the OBSSs Info field. The format of this field is shown in FIG. 20. When the intended receiver STA receives this field, it can use the information in the elements listed in the Elements List fields.

FIG. 20 illustrates an example embodiment 330 of the format of the Elements List field, as was seen in FIG. 19. The field can carry at least one Element as defined in IEEE 802.11. An Element field is an element that is shared with OBSS STAs.

FIG. 21 illustrates an example embodiment 350 of another format for the Elements Shared with OBSSs field. An OBSS Info field indicates which OBSSs that the information in the Elements shared with OBSSs field is shared with. The format of this field can be as that illustrated in FIG. 17. In at least one implementation, when this field is not present, the information in the Elements shared with OBSSs field is shared with any OBSSs.

An Indication of Specific Parameter Setting field consists of a list of indications, such as one-bit indications. For example using one-bit indications, each bit represents a field that is either an element (positive sense), or that is not an element (negative sense), (as defined in IEEE 802.11) thus providing indication of which specific parameter setting of the transmitter STA are included. When the field is used in a positive sense, then if a bit in this field is set to a first state (e.g., "1"), then the corresponding field or element is shared with OBSS STAs indicated in the OBSSs Info field. Otherwise, that bit is set to a second state (e.g., "0") and the corresponding field or element is not shared with the OBSS STAs indicated in OBSSs Info field. For example, one bit in this field can represent an EDCA element as defined in IEEE 802.11. When this bit is set to first state (e.g., "1"), the EDCA element carried by the same frame of the Elements shared with OBSSs field is shared with the OBSS STAs indicated in the OBSSs Info field. When this bit is set to a second state (e.g., "0"), the EDCA element is not shared with the OBSS STAs indicated in OBSSs Info field.

Figure 22:
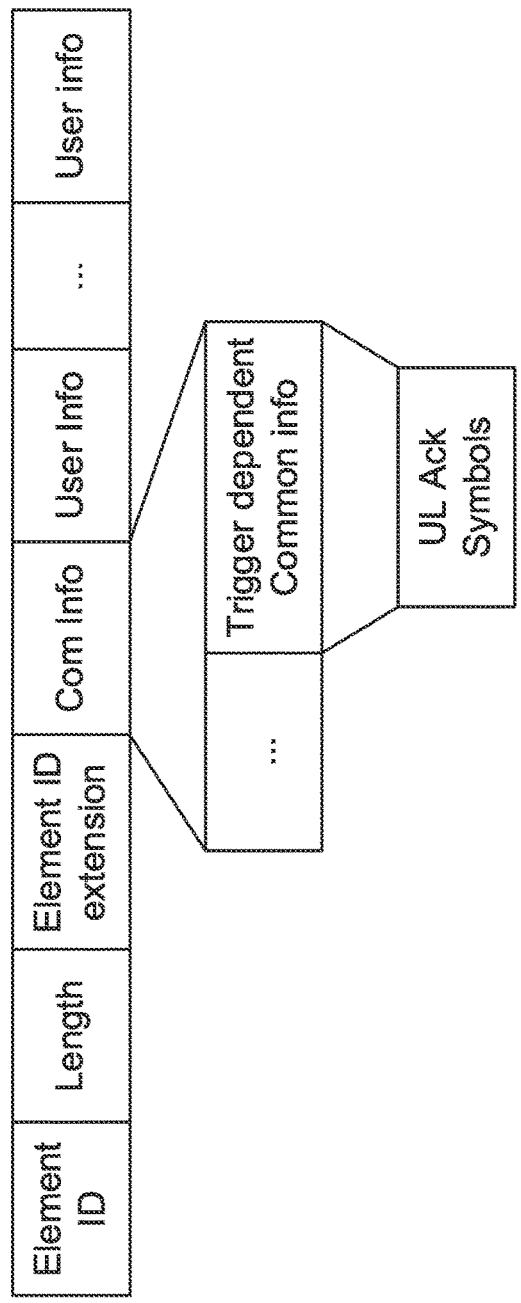
FIG. 22 is a data field diagram of a Triggered Response Request element according to at least one embodiment of the present disclosure.

FIG. 22 illustrates an example embodiment 370 of a triggered response request element. An Element ID and Element ID extension field provide identification of the element to indicate this element is a triggered response request element. A Length field indicates the length of the element. A Com Info (Communication Information) field can be utilized in the same manner as that in FIG. 4 except for the trigger dependent common info field. The Trigger Dependent Common Info field, can carry the UL ACK Symbols to indicate the number of OFDM symbols of the feedback, e.g., ACK or BA, that it requests. This indicates that when sending the receiver should not send more OFDM symbols (the padding of the feedback may not be counted) than are indicated in the UL ACK Symbols field. A User Info field can be used in the same way as described for FIG. 5. The transmitter STA sets this field to allocate the channel resources to the receiver STAs for performing feedback transmissions.

FIG. 23 illustrates an example embodiment 390 showing the format of the Latest Received Update Sequences element. An Element ID and Element ID extension field provide identification of the element to indicate this element is the Latest Received Update Sequences element. A Length field indicates the length of the element. A Received Update sequence field is set by the transmitter STA to indicate the latest update sequences of other STAs it has received. When a receiver STA receives this field, it can determine whether the latest update of its parameter settings has been received by the transmitter STA. A Number of BSSs field indicates the number value for the Update Sequence of OBSS fields. An Update Sequence of OBSS field is set by the transmitter STA to indicate the latest update sequence of another STA it has received. An OBSS Info field indicates which STA that the latest update sequence has been received from. The format of this field is shown in FIG. 17. Alternatively, this OBSS Info field can be set to indicate a STA from the same BSS of the transmitter STA. An Update Sequence field indicates the latest update sequence of the STA indicated in the OBSS Info field that the transmitter STA has received.

FIG. 24 illustrates an example embodiment 400 of an update sequence feedback request frame. A Frame Control field indicates the type of frame. A Duration field contains NAV information used for CSMA/CA channel access. An RA field contains an address for the recipient of the frame. A TA field contains the address of the STA which transmitted the frame. A BSS ID field provides a label to identify BSSs of the recipient. A Sequence Control field contains the fragment number and the sequence number of the packet.

A Triggered Response Request element has subfields which are described in FIG. 22. This field indicates which STAs are requested to send feedback after receiving this frame and indicates which channel resources should be used for sending feedback. When a STA receives the frame and requests to send feedback, it uses the channel resources indicated in the frame to send feedback to indicate the latest update sequence of the transmitter STA it recorded.

FIG. 25 illustrates an example embodiment 410 of an update sequence feedback frame. A Frame Control field indicates the type of frame. A Duration field contains NAV information used for CSMA/CA channel access. An RA field contains an address for the recipient of the frame. A Latest Received Update Sequences fields is set by the transmitter STA to indicate the latest received update sequence of the other STAs. When an intended receiver STA receives this field, it can discern whether the transmitter STA received the latest update of its parameter settings or not. The format of this field is as illustrated in FIG. 23.

FIG. 26 illustrates an example embodiment 430 of another format for an update sequence feedback frame. A Frame Control field indicates the type of frame. A Duration field contains NAV information used for CSMA/CA channel access. An RA field contains an address for the recipient of the frame.

An Update Sequence Receive Indication field is set by the transmitter STA to indicate whether it received an update sequence with the corresponding parameter settings from the receiver STA in the past one beacon interval time. This field may comprise a one-bit indication. If the field is set to a first state (e.g., "1"), then it indicates that the transmitter STA received an update sequence with the corresponding parameter settings from the receiver STA in the past one beacon interval time. Otherwise, this field is set to a second state (e.g., "0"). When an intended receiver STA receives this field, it can discern that its update sequence has been received by the transmitter STA in the past one beacon interval time.

5.3.3. Examples

This section provides several examples of these operation in explaining how an AP broadcasts a sharing frame and receives feedback from other STAs. In this section, a beacon frame is used, by way of example and not limitation, as a sharing frame format. It will be appreciated that other types of frames may be utilized as the sharing frame without limitation.

Figure 27:
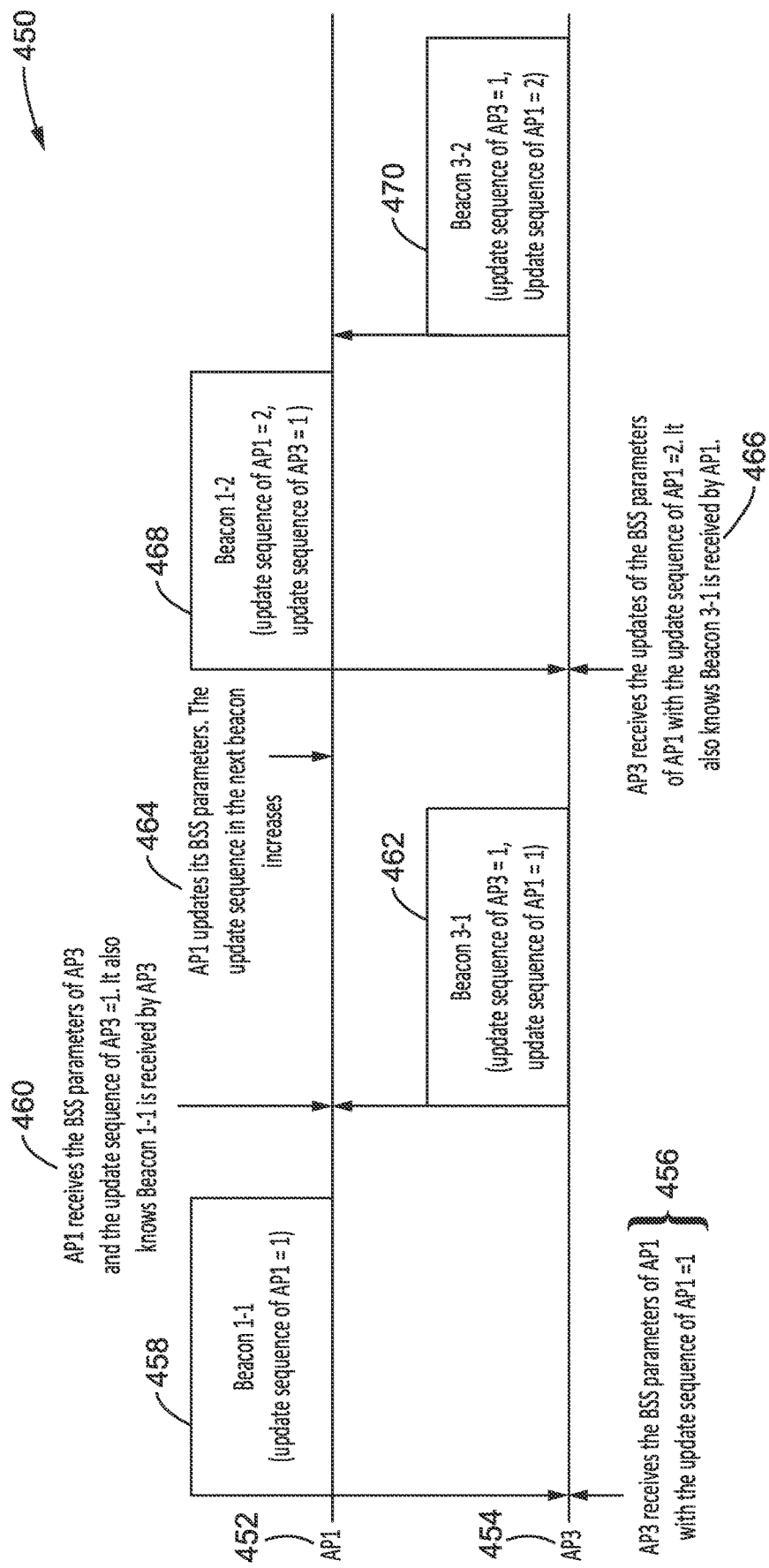
FIG. 27 is a communication diagram of multiple APs sharing their BSS parameters with each other through beacon frames according to at least one embodiment of the present disclosure.

FIG. 27 illustrates an example embodiment 450 depicting multiple APs sharing their BSS parameters with each other through beacon frames. The network topology is shown in FIG. 8. The format of beacon frames is shown in FIG. 13. In this example AP1 452 and AP3 454 are represented, only by way of example and not limitation.

AP1 broadcasts beacon 1-1 frame 458 to share its BSS parameter settings in the beacon 1-1 frame with AP3. In this beacon AP1 sets the update sequence to 1 and can indicate to share its BSS parameter settings with AP3 using the frame format as shown in FIG. 13. AP3 receives 456 beacon 1-1 from AP1 and records the update sequence and the BSS parameter settings of AP1 indicated in beacon 1-1. When AP3 broadcasts its beacon 462, i.e., beacon 3-1, it can share its BSS parameters settings in the beacon with AP1. In beacon 3-1 AP3 sets the update sequence in the beacon to 1. It can also indicate that the latest update sequence of AP1 reception is 1 in beacon 3-1. When AP1 receives Beacon 3-1 460, it can detect that its BSS parameter settings in Beacon 1-1 has been successfully shared with AP3.

AP1 can update 464 its BSS parameters before it transmits the next beacon. When the BSS parameters are changed, AP1 increases its update sequence for the next beacon, i.e., Beacon 1-2. When AP1 broadcasts beacon 1-2 468, the updated BSS parameters settings of AP1 are carried by beacon 1-2. The update sequence of AP1 in Beacon 1-2 is increased to 2. When AP3 receives beacon 1-2 466, it can discern that the BSS parameters of AP1 have been updated and records the new update sequence and the new BSS parameters of AP1.

Then AP3 broadcasts beacon 3-2 470. Since it received the new update sequence of AP1, it indicates in its beacon that it received the update sequence of AP1 which is equal to 2. When AP1 receives this beacon, it can recognize that its BSS parameter setting update has been successfully shared with AP3. If there is no update of the BSS parameter settings of AP3, the update sequence of AP3 does not increase in beacon 3-2.

Figure 28:
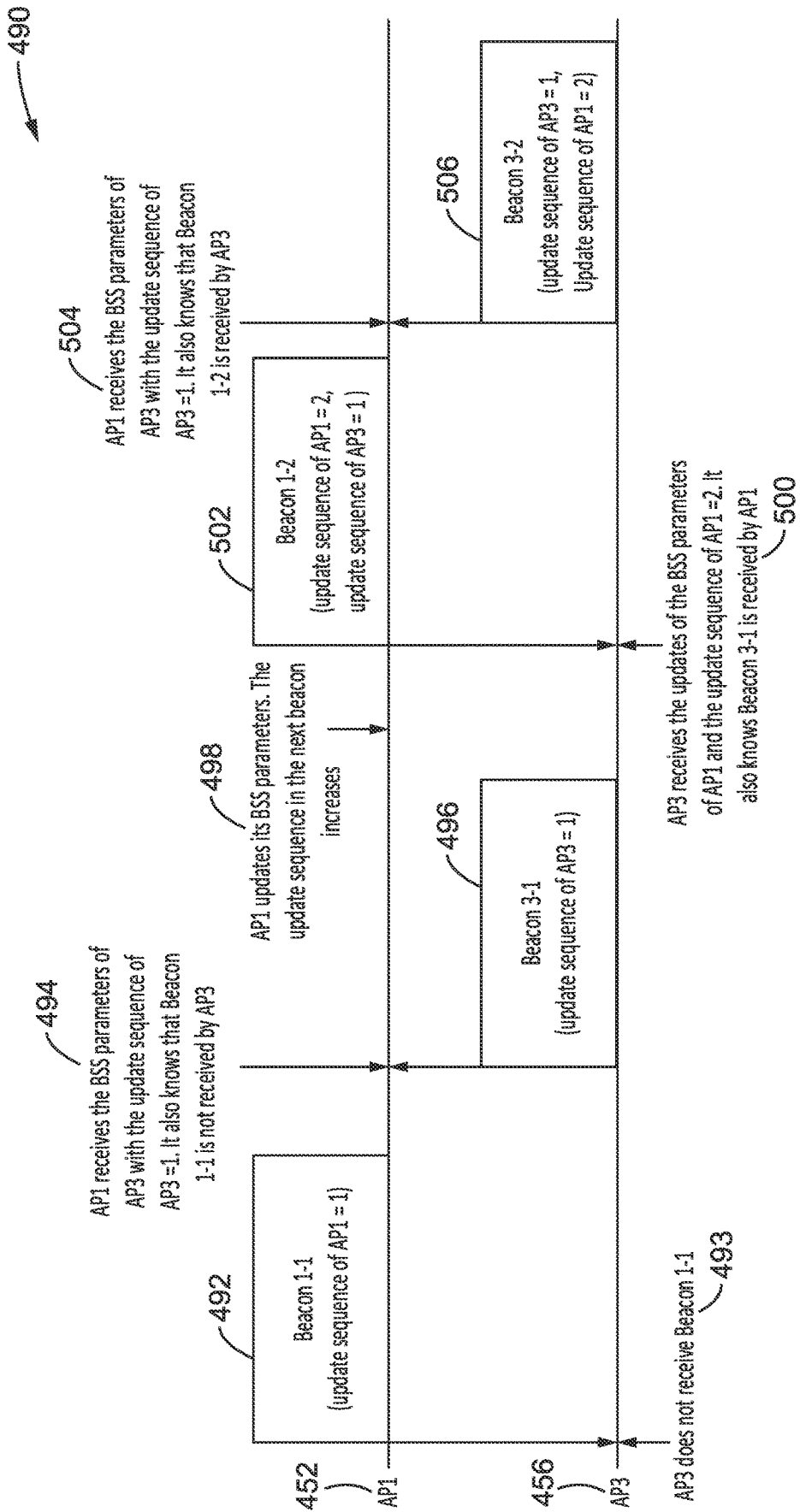
FIG. 28 is a communication diagram of an AP which has missed receiving a beacon from the OBSS STA according to at least one embodiment of the present disclosure.

FIG. 28 illustrates an example embodiment 490 of an AP which has missed information from a beacon received from the OBSS STA. The network topology is as exemplified in FIG. 8, and the same stations are depicted as in FIG. 27. The format of beacon frames is shown in FIG. 13.

AP1 broadcasts a beacon 1-1 frame 492 to share its BSS parameter settings in the beacon 1-1 frame with AP3. The update sequence of the beacon 1-1 frame is set to 1. AP1 can indicate the information it intends to share with AP3 using the frame format as shown in FIG. 13.

In this example, AP3 does not receive 493 beacon 1-1 from AP1. When AP3 broadcasts its beacon, i.e., beacon 3-1 496, it can share its BSS parameter settings in the beacon with AP1 and set its update sequence in the beacon to 1. But it does not indicate the update sequence of AP1 in its beacon, since it did not receive it. When AP1 receives 494 Beacon 3-1, it discerns from reading the update sequence, that the BSS parameter settings in Beacon 1-1 was not successfully shared with AP3.

AP1 can update its BSS parameters 498 before it transmits the next beacon. When the BSS parameters of AP1 are updated, AP1 increases its update sequence in the next beacon, i.e., beacon 1-2 502. When AP1 broadcasts beacon 1-2, beacon 1-2 carries the update of the BSS parameters setting of AP1. The update sequence of AP1 in Beacon 1-2 is increased to 2. When AP3 receives 500 beacon 1-2, it recognizes that the BSS parameters of AP1 have been updated and records the new update sequence of AP1.

Then AP3 broadcasts beacon 3-2 506. Since it receives the new update sequence of AP1, it indicates in its beacon that it receives the update sequence of AP2 which is equal to 2. When AP1 receives 504 this beacon, it recognizes that its BSS parameter setting update has been successfully shared with AP3. If there is no update of the BSS parameter settings of AP3, then update sequence 506 of AP3 does not increase in beacon 3-2.

Figure 29:
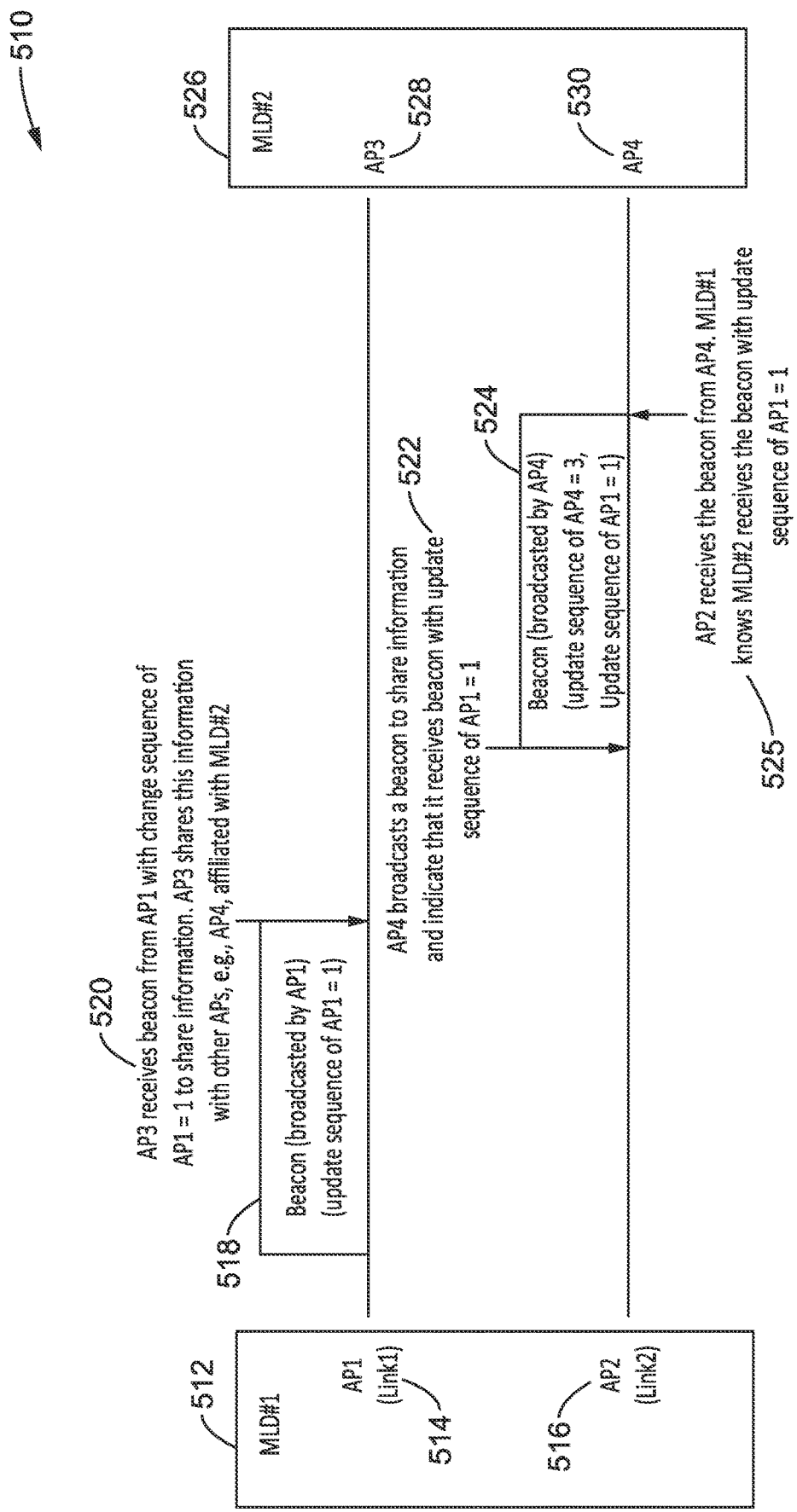
FIG. 29 is a communication diagram of an AP transmitting a beacon on one link and receiving the feedback of its beacon frame on a different link according to at least one embodiment of the present disclosure.

FIG. 29 illustrates an example embodiment 510 of an AP transmitting a beacon on one link and receiving the feedback of its beacon frame on a different link. The network topology is shown in FIG. 8, with interaction shown between MLD #1 512 with AP1 (Link1) 514 and AP2 (Link2) 516, communicating with MLD #2 526 with it AP3 528 and AP4 530. The format of beacon frames is shown in FIG. 13.

AP1 broadcasts a beacon frame 518 on link1 to share information with AP3. The update sequence of AP1 in the beacon frame broadcasted by AP1 is set to 1. AP1 can indicate and carry the information it intends to share with AP3 or other APs affiliated with MLD #2 using the frame format as shown in FIG. 13. AP3 receives 520 the beacon from AP1 and uses the information. It is noted 520 that AP3 may share the information in the beacon from AP1 with other APs affiliated with MLD #2, such as sharing with AP4 in this example. When AP4 broadcasts its beacon 524 on link2, it is noted 522 that AP4 can share information in the beacon with AP2 and indicates the update sequence of AP1 that AP3 received on Link1. As shown in the example, AP4 indicates in the beacon frame that the update sequence of AP1 is equal to 1. When AP2 receives 525 the Beacon from AP4, both AP1 and AP2 affiliated with MLD #1 can discern that the information in the beacon transmitted by AP1 was shared successfully with AP3 and AP4 affiliated with MLD #2.

Figure 30:
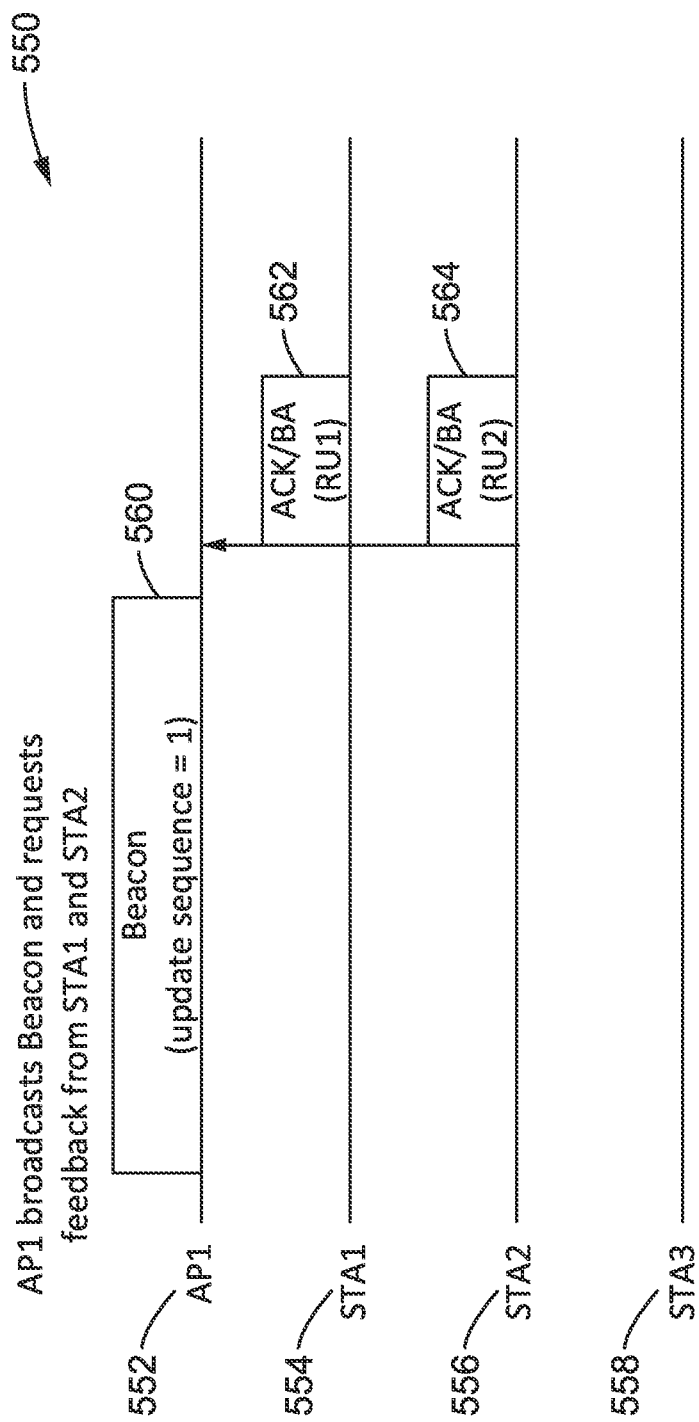
FIG. 30 is a communication diagram of an AP broadcasting a beacon and requesting feedback from specific STAs according to at least one embodiment of the present disclosure.

FIG. 30 illustrates an example embodiment 550 of an AP broadcasting a beacon and requesting feedback from specific STAs. The network topology is shown in FIG. 8. The format of beacon frames is shown in FIG. 13. The figure illustrates interactions between AP1 552, STA1 554, STA2 556 and STA3 558.

AP1 broadcasts a beacon frame 560 and requests feedback from STA1 and STA3. In the beacon frame, it indicates that STA1 and STA2 use Resource Unit 1 (RU1) and RU2 to send feedback, respectively. When STA1 and STA2 receive the beacon, they send feedback (ACK or BA) 562 and 564 in this case using RU1 and RU2 as requested by the beacon. When AP1 receives the feedback from STA1 and STA2, it discerns that the beacon has been received successfully by STA1 and STA2. If for example, AP1 did not receive feedback from STA1, then AP1 would recognize that STA1 did not receive the beacon correctly. STA3 also received the beacon from AP; however it was not requested to send feedback. It will be noted that AP1 might not ask STA3 for feedback, such as for example if STA1 and STA2 are the R-TWT scheduled STAs which support R-TWT operation and the update of R-TWT scheduling by the R-TWT scheduling AP will affect its operation (e.g., stop TXOP before the beginning of the R-TWT SP). However, if STA3 is not a R-TWT scheduled STA and thus does not support R-TWT operation, then it does not care about the change of the R-TWT scheduling.

It will be noted that the receivers of the beacon can be other APs or STAs which can be from the same BSS of AP1 or an OBSS.

Figure 31:
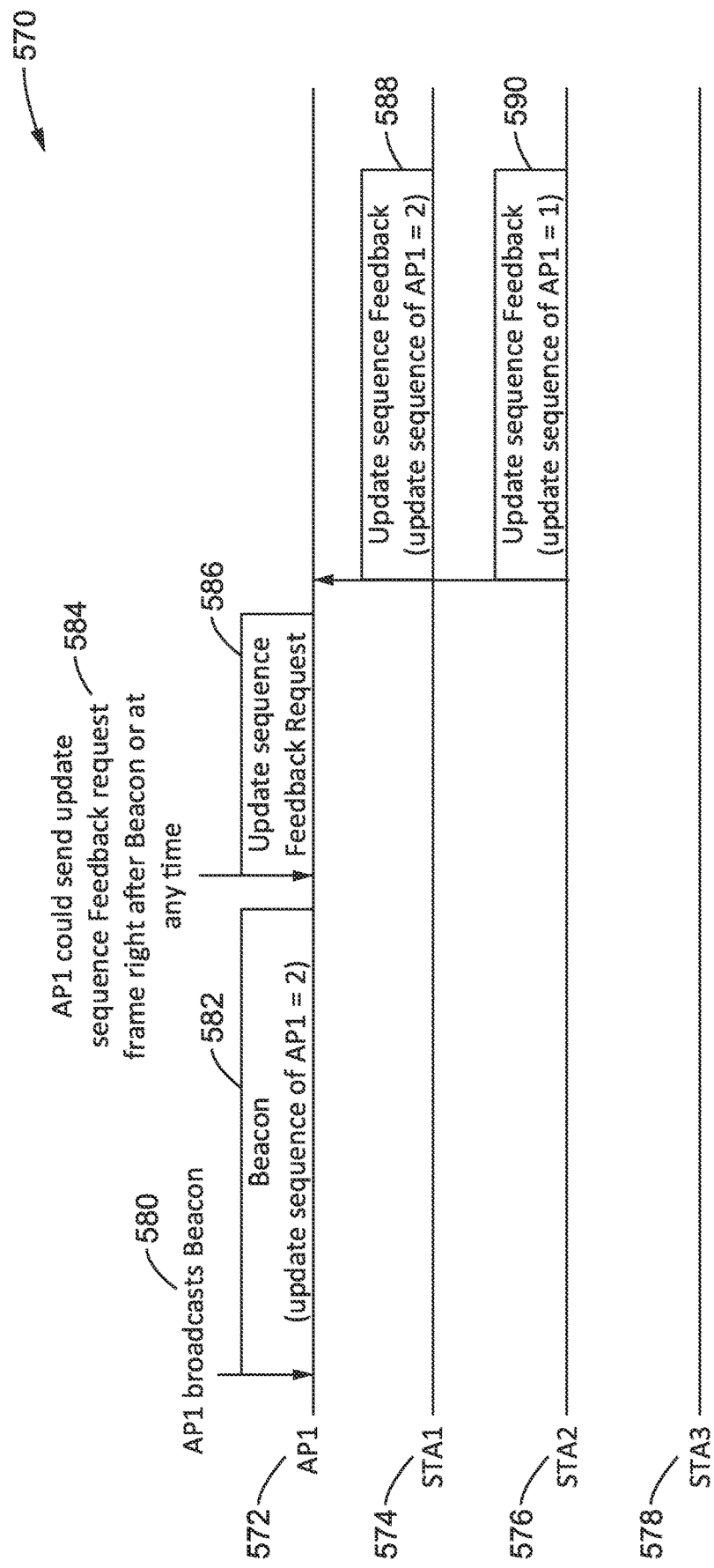
FIG. 31 is a communication diagram of an AP sending an update sequence feedback request frame to STAs according to at least one embodiment of the present disclosure.

FIG. 31 illustrates an example embodiment 570 of an AP sending an update sequence feedback request frame to STAs. The network topology is shown in FIG. 8. The format of beacon frames is shown in FIG. 13. The update sequence feedback frame is shown in FIG. 24 and the update sequence feedback frame is shown in FIG. 25. The figure illustrates interactions between AP1 572, STA1 574, STA2 576 and STA3 578.

AP1 broadcasts a beacon frame 580. In the beacon frame 582, it carries its update sequence=2 and the corresponding parameter settings. AP1 then sends an update sequence feedback request frame 586, to request the feedback from STA1 and STA2. It is noted 584 that the update sequence feedback request frame can be sent immediately after the beacon frame or at any time thereafter.

When STA1 and STA2 receive the update sequence feedback request frame from AP1, they send update sequence feedback frames 588 and 590 to report the latest update sequence of AP1 recorded on their sides. As shown in the example, STA1 and STA2 report the latest update sequences of AP1 they have received as 2 and 1, respectively. When AP1 receives the update sequence feedback from STA1 and STA2, it recognizes that STA1 received its latest parameter settings but STA2 did not.

It will be noted that AP1 can send an update sequence feedback request frame to any APs or STAs from the same BSS of AP1 or OBSS. That is, it is possible that STA1 and STA2 in this example and other examples are APs or STAs which are from the same BSS of AP1 or an OBSS.

Figure 32:
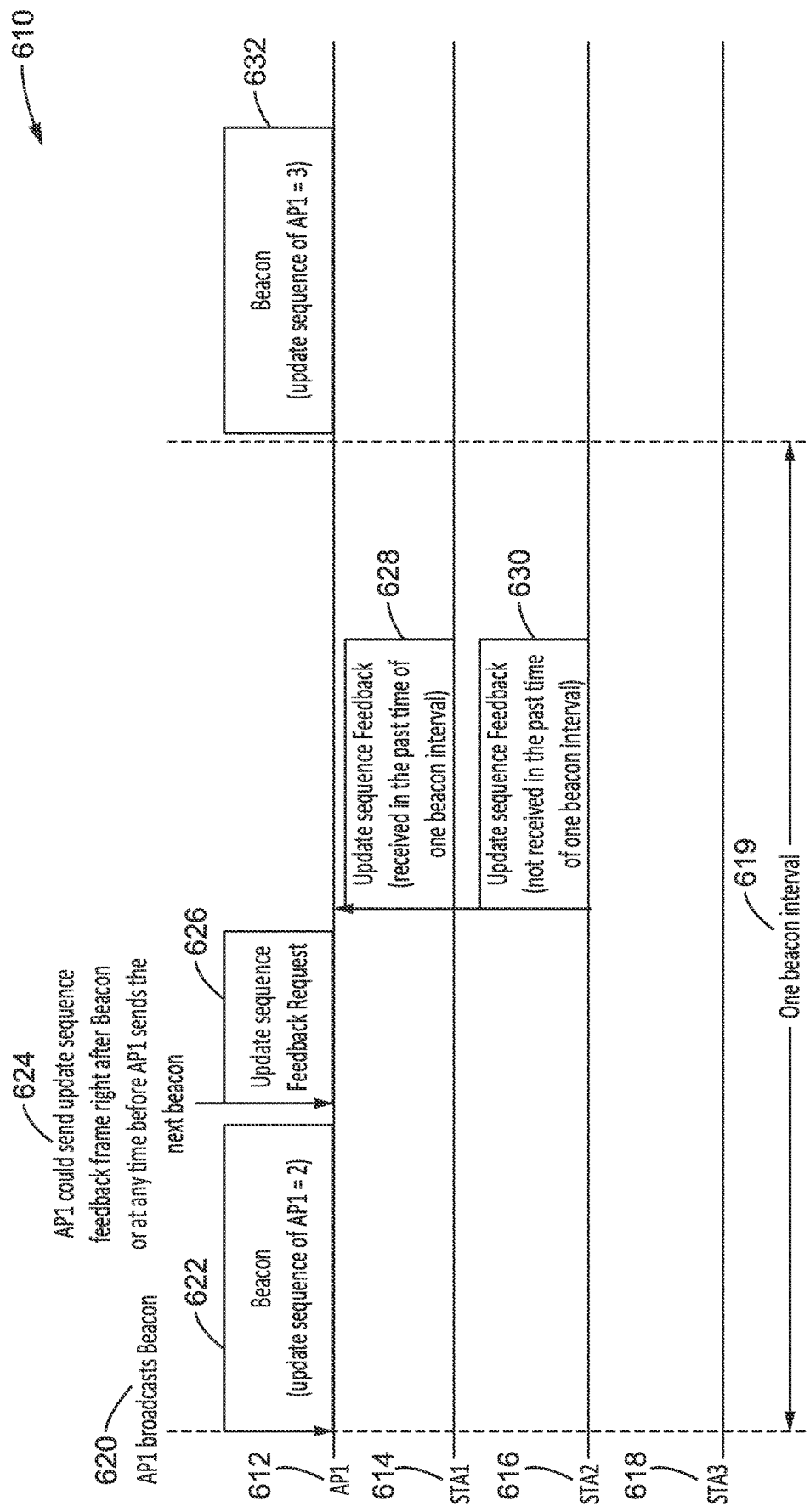
FIG. 32 is a communication diagram of an AP sending an update sequence feedback request frame to STAs according to at least one embodiment of the present disclosure.

FIG. 32 illustrates an example embodiment 610 of an AP sending an update sequence feedback request frame to STAs. The network topology is shown in FIG. 8. The format of beacon frames is shown in FIG. 13. The update sequence feedback frame is shown in FIG. 24 and the update sequence feedback frame is shown in FIG. 26. The figure illustrates interactions between AP1 612, STA1 614, STA2 616 and STA3 618.

In one beacon interval 619, AP1 broadcasts a beacon frame 620. In the beacon frame, it carries its update 622 sequence=2 and the corresponding parameter settings. AP1 then sends an update sequence feedback request frame 626 to request the feedback from STA1 and STA2. It is noted 624 that the update sequence feedback request frame can be sent immediately after the beacon frame or at any other time thereafter.

When STA1 and STA2 receive the update sequence feedback request frame from AP1, they send update sequence feedback frames 628 and 630 to report whether they received the update sequence of AP1 and the corresponding parameter settings in the past one beacon interval time.

As shown in the example, STA1 reports that it receives the update sequence of AP1 and the corresponding parameter settings in the past one beacon interval time. That is, STA1 received the beacon frame with update sequence of AP1=2. STA2 reports that it did not received the update sequence of AP1 and the corresponding parameter settings in the past one beacon interval time. That is, STA1 did not receive the beacon frame for longer than one beacon interval time. When AP1 receives the update sequence feedback from STA1 and STA2, it determines that STA1 received its latest parameter settings but STA2 did not receive it. AP1 is then seen sending a beacon 632 to STA3 with an update sequence of AP1=3.

It should be noted that AP1 can send an update sequence feedback request frame to any APs or STAs from the same BSS of AP1 or OBSS. That is, it is possible that STA1 and STA2 in the example are APs or STAs which are from the same BSS of AP1 or OBSS.

6. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) operating under IEEE 802.11 as either an Access Point (AP) or a non-AP STA, is configured for wirelessly communicating packets over a channel with other wireless stations (STAs), which are either APs or non-AP STAs, on a wireless local area network (WLAN) in which Carrier Sense Multiple Access/Collision Avoidance (CSMA/CA) is applied; (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps of broadcasting a type of sharing frame containing sharing information which carries specific parameter settings to share with other STAs comprising: (d)(i) a STA communicates an update sequence to indicate the version of its specific parameter settings; (d)(ii) a STA operating as a first STA broadcasts a sharing frame carrying an update sequence and specific parameter settings to share with other STAs on the WLAN; (d)(iii) receiving said sharing frame by said second STA as received from said first STA, and recording the update sequence of the first STA by said second station; and (d)(iv) reporting a most recent update sequence as received from said first STA, by said second station broadcasting a sharing frame including update sequence information.

An apparatus for wireless communication in a network, the apparatus comprising: (a) a wireless communication circuit, as a wireless station (STA) operating under IEEE 802.11 as either an Access Point (AP) or a non-AP STA, is configured for wirelessly communicating packets over a channel with other wireless stations (STAs), which are either APs or non-AP STAs, on a wireless local area network (WLAN) in which Carrier Sense Multiple Access/Collision Avoidance (CSMA/CA) is applied; (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps of broadcasting a type of sharing frame containing sharing information which carries specific parameter settings to share with other STAs comprising broadcasting a sharing frame containing specific parameter settings and requesting feedback upon receipt of the sharing frame from specific STAs on the network, so that STAs on the network can determine that they are being requested to send feedback and send an indication that the sharing frame was received correctly.

An apparatus for wireless communication in a network, the apparatus comprising: (a) a wireless communication circuit, as a wireless station (STA) operating under IEEE 802.11 as either an Access Point (AP) or a non-AP STA, is configured for wirelessly communicating packets over a channel with other wireless stations (STAs), which are either APs or non-AP STAs, on a wireless local area network (WLAN) in which Carrier Sense Multiple Access/Collision Avoidance (CSMA/CA) is applied; (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps of broadcasting a type of sharing frame containing sharing information which carries specific parameter settings to share with other STAs comprising: (d)(i) indicating, by said STA acting as a transmitter in a first BSS, which information is being shared with an overlapped basic service set (OBSS) when said STA broadcasts a beacon frame to an STA in the OBSS; and (d)(ii) receiving, by said STA acting as a receiver in an OBSS, the broadcast frame and using the indication on which information is being shared in determining which parameters to utilize.

A method for performing wireless communication in a network configured for wirelessly communicating under IEEE 802.11 packets over a channel with other wireless stations (STAs) on a wireless local area network (WLAN) in which Carrier Sense Multiple Access/Collision Avoidance (CSMA/CA) is applied, comprising steps: (a) broadcasting a sharing frame containing information about parameter settings to other STAs in a basic service set; (b) communicating an update sequence which incorporates version information for the specific parameter settings for sharing with other STAs on the WLAN; (c) receiving the sharing frame by a second STA on the network which performs recording of the version information from the update sequence; and (d) reporting recent update sequence version information as received from said STA, when said second station broadcasts a sharing frame including the recorded version information from the update sequence.

The apparatus or method of any preceding implementation, wherein said instructions when executed by the processor further perform steps comprising incrementing an update sequence value in the next sharing frame when said STA has an update of its specific parameter settings prior to said STA broadcasting a sharing frame containing an update sequence.

The apparatus or method of any preceding implementation, wherein said sharing frame being shared by said first STA comprises an update sequence in a specific field of the frame utilized for communicating a sequence control field.

The apparatus or method of any preceding implementation, wherein said instructions when executed by the processor further perform steps comprising sharing the update sequence information in a frame being shared with Overlapped Basic Service Set (OBSS) STAs.

The apparatus or method of any preceding implementation, wherein said instructions when executed by the processor further perform steps comprising utilizing the sharing information and update sequence as received by said second station receiving a sharing frame, even if the sharing information is received from a different BSSs.

The apparatus or method of any preceding implementation, wherein said first STA and said second STA can operate on different links.

The apparatus or method of any preceding implementation, wherein said instructions when executed by the processor further perform steps comprising: (a) requesting feedback for the frame from specific STAs when said STA broadcasts a sharing frame; and (b) receiving feedback as other STAs perform the request by indicating whether the sharing frame was received correctly.

The apparatus or method of any preceding implementation, wherein said instructions when executed by the processor further perform steps comprising allocating channel resources for transmission of feedback when said STA broadcasts a frame and requests feedback of the frame.

The apparatus or method of any preceding implementation, wherein said instructions when executed by the processor further perform steps comprising indicating which information from the specific parameters settings are to be shared with an OBSS STA when said STA transmits a broadcast frame, so that said OBSS STA utilize the indicated information from the broadcast frame.

The apparatus or method of any preceding implementation, wherein said instructions when executed by the processor further perform steps comprising indicating which OBSS STAs the specific parameter settings are to be shared with when said STA broadcasts a frame and requests feedback for the frame.

The apparatus or method of any preceding implementation, wherein said instructions when executed by the processor further comprises indicating which information of the specific parameter settings are to be shared with the OBSS in a field for indicating high throughput (HT) control information.

The apparatus or method of any preceding implementation, wherein said instructions when executed by the processor further comprises indicating which information of the specific parameter settings are to be shared with the OBSS in a field containing an OBSS-shared element.

The apparatus or method of any preceding implementation, wherein said instructions when executed by the processor further perform steps comprising allocating channel resources to support transmission of the feedback when said STA broadcasting the frame requests feedback of the frame reception.

The apparatus or method of any preceding implementation, wherein said instructions when executed by the processor further perform steps comprising indicating which OBSS STAs the specific parameter settings are to be shared with when said STA broadcasts a frame and requests feedback for the frame.

The apparatus or method of any preceding implementation, wherein said instructions when executed by the processor further comprises indicating which information of the specific parameter settings are to be shared with the OBSS in a field for indicating high throughput (HT) control information.

The apparatus or method of any preceding implementation, wherein said instructions when executed by the processor further comprises indicating which information of the specific parameter settings are to be shared with the OBSS in a field containing an OBSS-shared element.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:

(a) a wireless communication circuit, as a wireless station (STA) operating under IEEE 802.11 as either an Access Point (AP) or a non-AP STA, is configured for wirelessly communicating packets over a channel with other wireless stations (STAs), which are either APs or non-AP STAs, on a wireless local area network (WLAN) in which Carrier Sense Multiple Access/Collision Avoidance (CSMA/CA) is applied;

(b) a processor coupled to said wireless communication circuit for operating on the WLAN as a STA;

(c) a non-transitory memory storing instructions executable by the processor for communicating with other STAs; and (d) wherein said instructions, when executed by the processor, perform one or more steps of broadcasting a type of sharing frame containing sharing information which carries specific parameter settings to share with other STAs comprising:

(i) a STA communicates an update sequence to indicate the version of its specific parameter settings;

(ii) a STA operating as a first STA broadcasts a sharing frame carrying an update sequence and specific parameter settings to share with other STAs on the WLAN;

(iii) receiving said sharing frame by said second STA as received from said first STA, and recording the update sequence of the first STA by said second station; and (iv) reporting a most recent update sequence as received from said first STA, by said second station broadcasting a sharing frame including update sequence information.

2. The apparatus of claim 1, wherein said instructions when executed by the processor further perform steps comprising incrementing an update sequence value in the next sharing frame when said STA has an update of its specific parameter settings prior to said STA broadcasting a sharing frame containing an update sequence.

3. The apparatus of claim 1, wherein said sharing frame being shared by said first STA comprises an update sequence in a specific field of the frame utilized for communicating a sequence control field.

4. The apparatus of claim 1, wherein said instructions when executed by the processor further perform steps comprising sharing the update sequence information in a frame being shared with Overlapped Basic Service Set (OBSS) STAs.

5. The apparatus of claim 1, wherein said instructions when executed by the processor further perform steps comprising utilizing the sharing information and update sequence as received by said second station receiving a sharing frame, even if the sharing information is received from a different BSSs.

6. The apparatus of claim 1, wherein said first STA and said second STA can operate on different links.

7. The apparatus of claim 1, wherein said instructions when executed by the processor further perform steps comprising:

requesting feedback for the frame from specific STAs when said STA broadcasts a sharing frame; and receiving feedback as other STAs perform the request by indicating whether the sharing frame was received correctly.

8. The apparatus of claim 7, wherein said instructions when executed by the processor further perform steps comprising allocating channel resources for transmission of feedback when said STA broadcasts a frame and requests feedback of the frame.

9. The apparatus of claim 1, wherein said instructions when executed by the processor further perform steps comprising indicating which information from the specific parameters settings are to be shared with an OBSS STA when said STA transmits a broadcast frame, so that said OBSS STA utilize the indicated information from the broadcast frame.

10. The apparatus of claim 1, wherein said instructions when executed by the processor further perform steps comprising indicating which OBSS STAs the specific parameter settings are to be shared with when said STA broadcasts a frame and requests feedback for the frame.

11. The apparatus of claim 10, wherein said instructions when executed by the processor further comprises indicating which information of the specific parameter settings are to be shared with the OBSS in a field for indicating high throughput (HT) control information.

12. The apparatus of claim 10, wherein said instructions when executed by the processor further comprises indicating which information of the specific parameter settings are to be shared with the OBSS in a field containing an OBSS-shared element.

13. An apparatus for wireless communication in a network, the apparatus comprising:
(a) a wireless communication circuit, as a wireless station (STA) operating under IEEE 802.11 as either an Access Point (AP) or a non-AP STA, is configured for wirelessly communicating packets over a channel with other wireless stations (STAs), which are either APs or non-AP STAs, on a wireless local area network (WLAN) in which Carrier Sense Multiple Access/Collision Avoidance (CSMA/CA) is applied;
(b) a processor coupled to said wireless communication circuit for operating on the WLAN as a STA;
(c) a non-transitory memory storing instructions executable by the processor for communicating with other STAs; and
(d) wherein said instructions, when executed by the processor, perform one or more steps of broadcasting a type of sharing frame containing sharing information which carries specific parameter settings to share with other STAs comprising broadcasting a sharing frame containing specific parameter settings and requesting feedback upon receipt of the sharing frame from specific STAs on the network, so that STAs on the network can determine that they are being requested to send feedback and send an indication that the sharing frame was received correctly.

14. The apparatus of claim 13, wherein said instructions when executed by the processor further perform steps comprising allocating channel resources to support transmission of the feedback when said STA broadcasting the frame requests feedback of the frame reception.

15. An apparatus for wireless communication in a network, the apparatus comprising:
(a) a wireless communication circuit, as a wireless station (STA) operating under IEEE 802.11 as either an Access Point (AP) or a non-AP STA, is configured for wirelessly communicating packets over a channel with other wireless stations (STAs), which are either APs or non-AP STAs, on a wireless local area network (WLAN) in which Carrier Sense Multiple Access/Collision Avoidance (CSMA/CA) is applied;
(b) a processor coupled to said wireless communication circuit for operating on the WLAN as a STA;
(c) a non-transitory memory storing instructions executable by the processor for communicating with other STAs; and
(d) wherein said instructions, when executed by the processor, perform one or more steps of broadcasting a type of sharing frame containing sharing information which carries specific parameter settings to share with other STAs comprising:
(i) indicating, by said STA acting as a transmitter in a first BSS, which information is being shared with an overlapped basic service set (OBSS) when said STA broadcasts a beacon frame to an STA in the OBSS; and
(ii) receiving, by said STA acting as a receiver in an OBSS, the broadcast frame and using the indication on which information is being shared in determining which parameters to utilize.

16. The apparatus of claim 15, wherein said instructions when executed by the processor further perform steps comprising indicating which OBSS STAs the specific parameter settings are to be shared with when said STA broadcasts a frame and requests feedback for the frame.

17. The apparatus of claim 16, wherein said instructions when executed by the processor further comprises indicating which information of the specific parameter settings are to be shared with the OBSS in a field for indicating high throughput (HT) control information.

18. The apparatus of claim 16, wherein said instructions when executed by the processor further comprises indicating which information of the specific parameter settings are to be shared with the OBSS in a field containing an OBSS-shared element.

19. A method for performing wireless communication in a network configured for wirelessly communicating under IEEE 802.11 packets over a channel with other wireless stations (STAs) on a wireless local area network (WLAN) in which Carrier Sense Multiple Access/Collision Avoidance (CSMA/CA) is applied, comprising steps:
(a) broadcasting a sharing frame containing information about parameter settings to other STAs in a basic service set;
(b) communicating an update sequence which incorporates version information for the specific parameter settings for sharing with other STAs on the WLAN;
(c) receiving the sharing frame by a second STA on the network which performs recording of the version information from the update sequence; and
(d) reporting recent update sequence version information as received from said STA, when said second station broadcasts a sharing frame including the recorded version information from the update sequence.

* * * * *